(12) United States Patent
Imai et al.

(10) Patent No.: US 9,864,563 B2
(45) Date of Patent: Jan. 9, 2018

(54) INFORMATION PROCESSING APPARATUS, IMAGE DISPLAY METHOD, AND COMMUNICATION SYSTEM

(71) Applicants: Takuya Imai, Tokyo (JP); Kenichiro Morita, Tokyo (JP); Shoh Nagamine, Kanagawa (JP)

(72) Inventors: Takuya Imai, Tokyo (JP); Kenichiro Morita, Tokyo (JP); Shoh Nagamine, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/219,854

(22) Filed: Jul. 26, 2016

(65) Prior Publication Data

US 2017/0031646 A1    Feb. 2, 2017

(30) Foreign Application Priority Data

Jul. 28, 2015  (JP) ................. 2015-148656

(51) Int. Cl.
*G06F 5/00*    (2006.01)
*G06F 3/14*    (2006.01)
(Continued)

(52) U.S. Cl.
CPC .......... *G06F 3/1454* (2013.01); *G09G 5/003* (2013.01); *H04N 7/147* (2013.01); *H04N 7/15* (2013.01);
(Continued)

(58) Field of Classification Search
CPC .............. G09G 2370/02; G09G 5/003; G09G 2370/20; G09G 2340/14; G09G 2320/10; G06F 3/1454; H04N 7/15; H04N 7/147
See application file for complete search history.

(56) References Cited

U.S. PATENT DOCUMENTS 9,374,556 B2    6/2016 Nagamine et al.
2005/0099492 A1    5/2005 Orr
(Continued)

FOREIGN PATENT DOCUMENTS

JP    2013-055403    3/2013
JP    2014-082573    5/2014
(Continued)

OTHER PUBLICATIONS

Extended European Search Report dated Jan. 5, 2017 in Patent Application No. 16181258.1.

*Primary Examiner* — Muhammad N Edun
(74) *Attorney, Agent, or Firm* — Oblon, McClelland, Maier & Neustadt, L.L.P.

(57) ABSTRACT

An information processing apparatus includes a receiver configured to receive images from other information processing apparatuses via a network; a determiner configured to determine a number of the images to be displayed on a display device based on a communication status; a determiner configured to determine a layout of a screen on which the images are displayed, according to the determined number; a determiner configured to determine whether a predetermined time has passed from when the layout has been previously changed, when the determined number is different from the number presently displayed; and a display processor configured to display the screen having the previously changed layout until the predetermined time is determined to have passed since the layout is previously changed, and to display the screen having a different layout, which is newly determined, when the predetermined time is determined to have passed since the layout is previously changed.

9 Claims, 17 Drawing Sheets

(51) Int. Cl.
*H04N 7/14* (2006.01)
*H04N 7/15* (2006.01)
*G09G 5/00* (2006.01)

(52) U.S. Cl.
CPC ..... *G09G 2320/10* (2013.01); *G09G 2340/14* (2013.01); *G09G 2370/02* (2013.01); *G09G 2370/20* (2013.01)

(56) References Cited

U.S. PATENT DOCUMENTS

| | | | |
|---|---|---|---|
| 2010/0031132 A1* | 2/2010 | Yamaji | G06F 17/211 715/203 |
| 2011/0279640 A1 | 11/2011 | Choi | |
| 2013/0060926 A1 | 3/2013 | Kato et al. | |
| 2013/0109915 A1* | 5/2013 | Krupnik | G06T 3/4038 600/109 |
| 2013/0191479 A1 | 7/2013 | Gottlieb | |
| 2014/0085325 A1* | 3/2014 | Tsukada | G09G 5/006 345/589 |
| 2014/0104373 A1 | 4/2014 | Kato et al. | |
| 2015/0067543 A1 | 3/2015 | Mo | |
| 2015/0092014 A1 | 4/2015 | Kariti et al. | |
| 2016/0094594 A1 | 3/2016 | Imai et al. | |
| 2016/0094595 A1 | 3/2016 | Shiro et al. | |

FOREIGN PATENT DOCUMENTS

| | | |
|---|---|---|
| JP | 2016-072969 | 5/2016 |
| JP | 2016-072970 | 5/2016 |
| JP | 2016-111684 | 6/2016 |
| WO | WO 2014/208569 A1 | 12/2014 |

* cited by examiner

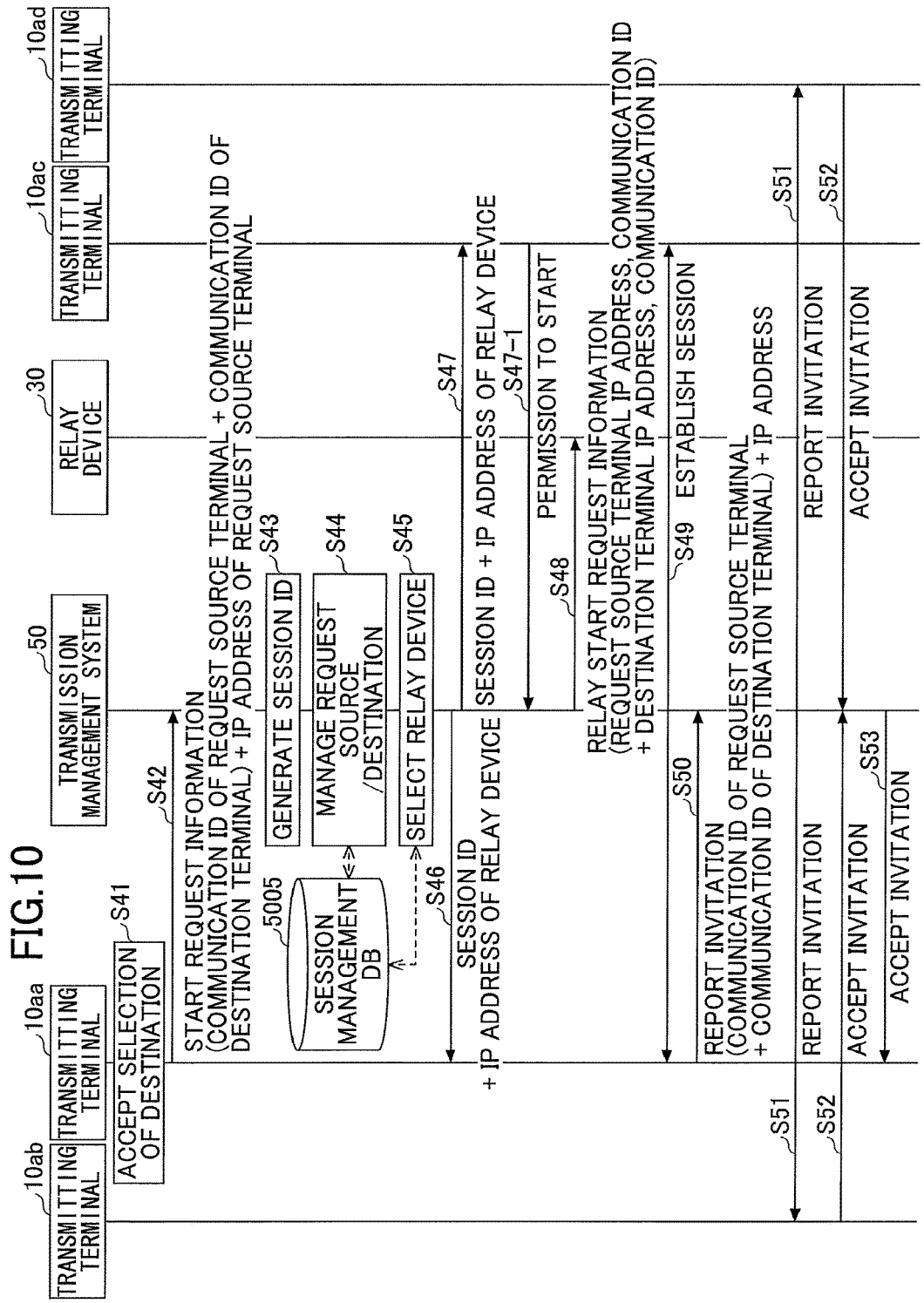

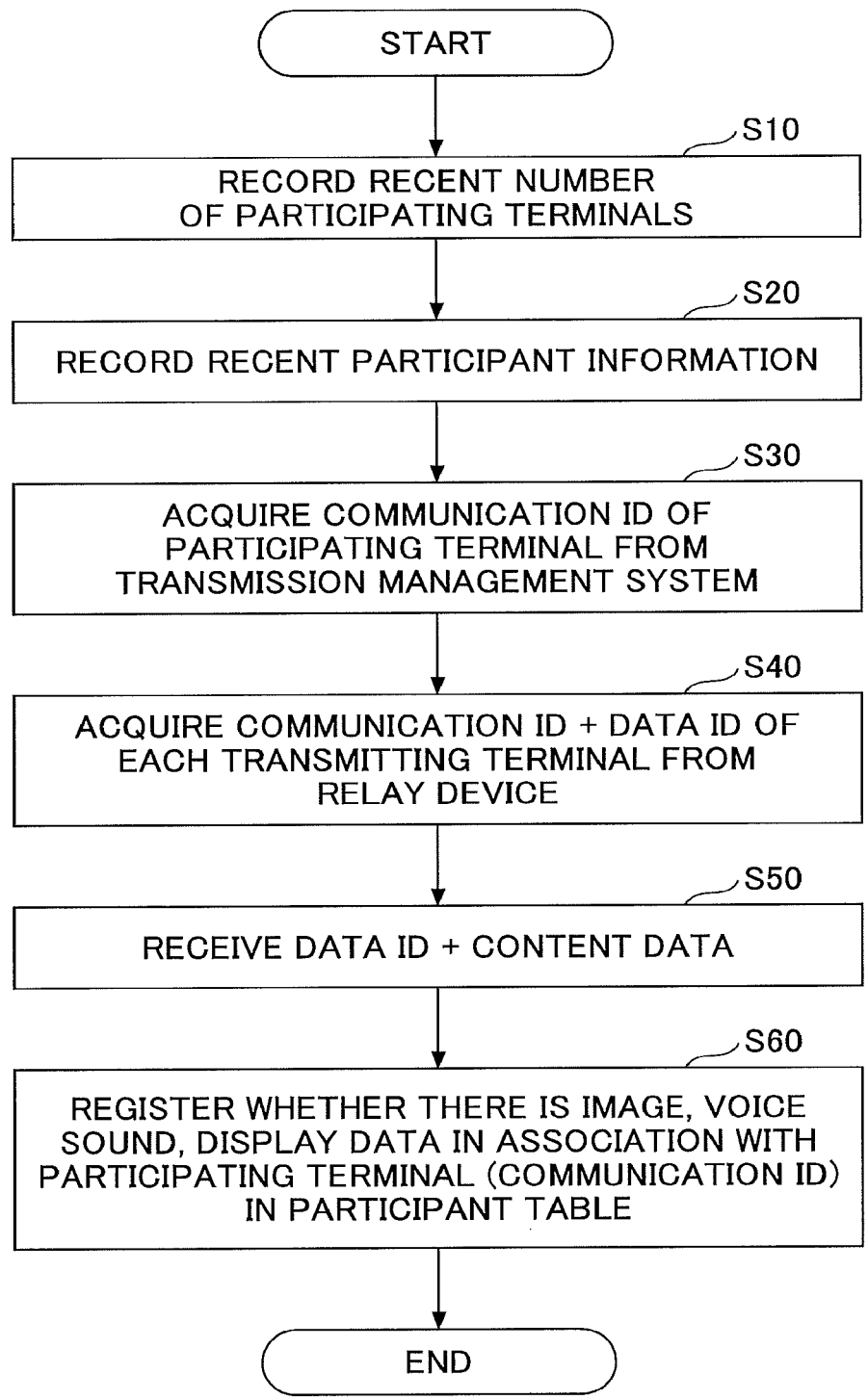

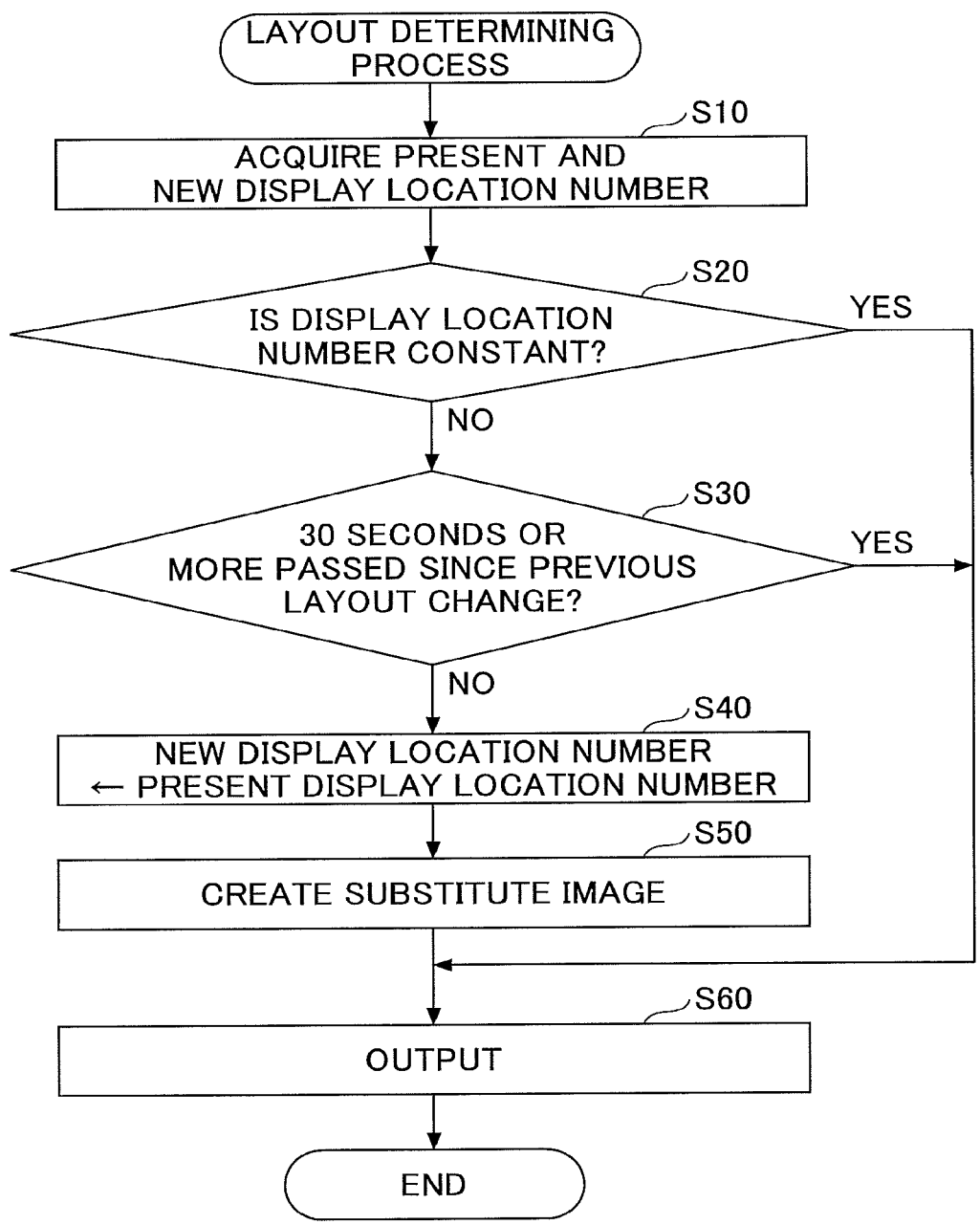

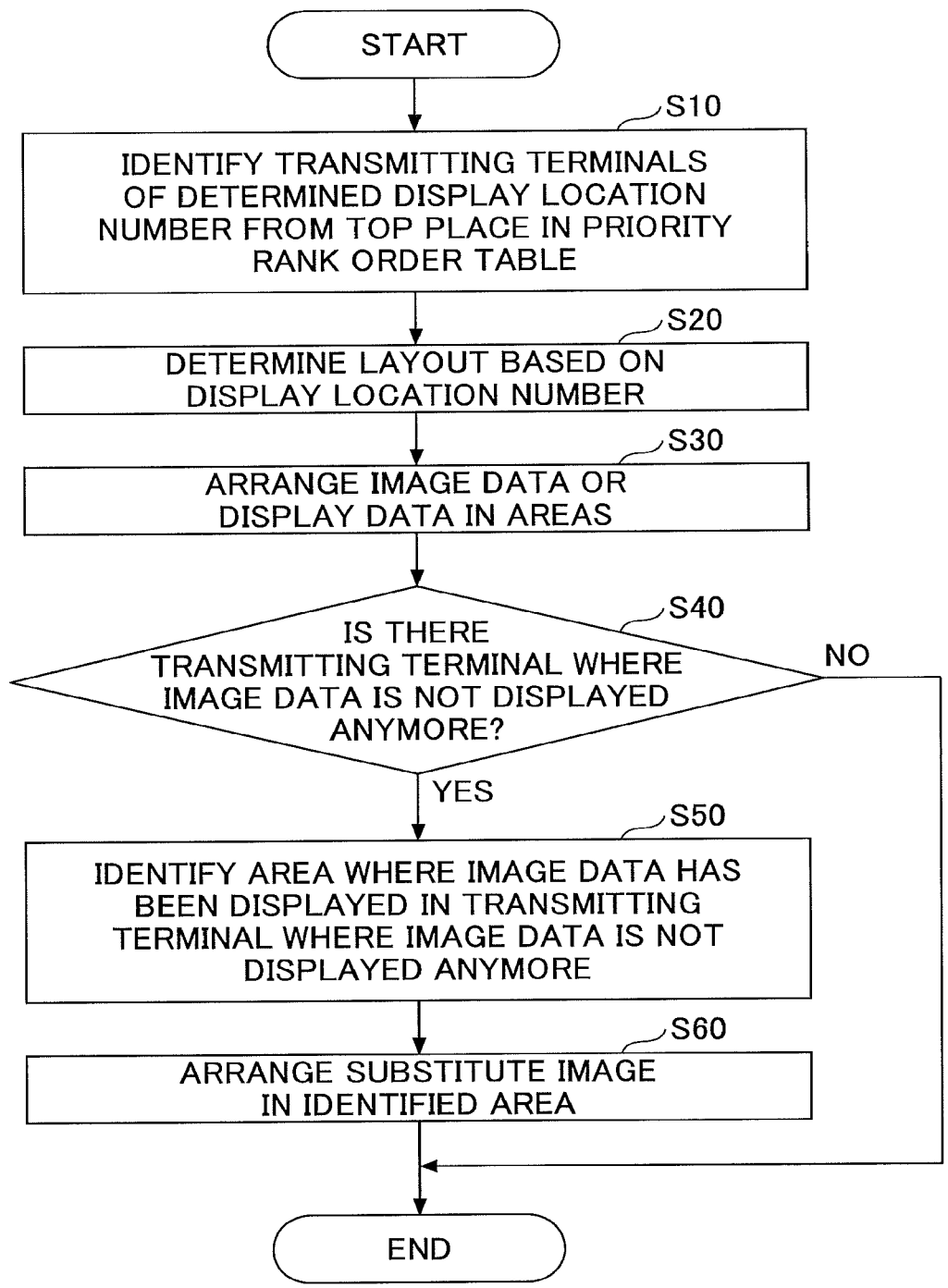

INFORMATION PROCESSING APPARATUS, IMAGE DISPLAY METHOD, AND COMMUNICATION SYSTEM

CROSS-REFERENCE TO RELATED APPLICATION

The present application claims the benefit of priority under 35 U.S.C. §119 of Japanese Patent Application No. 2015-148656, filed on Jul. 28, 2015, the contents of which are incorporated herein by reference in their entirety.

BACKGROUND OF THE INVENTION

1. Field of the Invention

The present invention relates to an information processing apparatus, an image display method, and a communication system.

2. Description of the Related Art

There is known a TV conference as an example of a transmission system for holding a TV conference among a plurality of terminal devices via a communication network such as the Internet. In such a TV conference system, image data and voice sound data, which are collected during a TV conference at one terminal device, are sent to another terminal device. The other terminal device receives the image data and the voice sound data, and displays images on a display, etc., and outputs voice sound from a speaker. Accordingly, a TV conference can be held between these terminal devices.

However, the delay in data passing through the Internet is not always constant. Therefore, there is no guarantee that a constantly stable reception band is secured. Accordingly, the band, which can be used for communicating image data and voice sound data that are sent and received in a TV conference, is always changing. In the terminal devices, a media control technology is adopted for the purpose of guaranteeing smooth conversations even in an unstable reception band. In the media control technology, when the reception band decreases, smooth conversations are prioritized, and therefore image data having low resolution is received by the terminal device. When the reception band further decreases, the voice sound data is prioritized, therefore the terminal device implements control such that image data is not received at all.

When the terminal device cannot receive image data anymore according to the media control technology, the user may not be able to distinguish this case from a case where the image data cannot be received because transmission of image data has been interrupted at the sending terminal side. As a measure for such inconveniences, a technology for reporting the reason why image data cannot be received to the user of the receiving terminal side, is proposed (see, for example, Patent Document 1). Patent Document 1 discloses a transmission system having the following features. Specifically, when the relaying of image data to a receiving terminal is interrupted due to the decrease of the reception band, the receiving terminal displays a message saying that image data will not be received or that only voice sound data will be received.

Patent Document 1: Japanese Unexamined Patent Application Publication No. 2013-55403

SUMMARY OF THE INVENTION

An aspect of the present invention provides an information processing apparatus, an image display method, and a communication system, in which one or more of the above-described disadvantages are reduced.

According to one aspect of the present invention, there is provided an information processing apparatus including a receiver configured to receive one or more images from one or more other information processing apparatuses communicating with the information processing apparatus via a network; a display number determiner configured to determine a number of the one or more images to be displayed on a display device based on a communication status; a layout determiner configured to determine a layout of a screen on which the one or more images are displayed, according to the number of the one or more images determined by the display number determiner; a time determiner configured to determine whether a predetermined time has passed from when the layout has been previously changed, when the display number determiner has determined to display a different number of the one or more images on the screen from the number of the one or more images that are displayed on the screen; and a display processor configured to display the screen having the layout, which has been previously changed, on the display device without changing the layout until the time determiner determines that the predetermined time has passed from when the layout has been previously changed, and to display the screen having a different layout, which is different from the layout of the screen being displayed and which is newly determined by the layout determiner, on the display device when the time determiner determines that the predetermined time has passed from when the layout has been previously changed.

BRIEF DESCRIPTION OF THE DRAWINGS

Other objects, features and advantages of the present invention will become more apparent from the following detailed description when read in conjunction with the accompanying drawings, in which:

FIG. 10 is a sequence diagram of an example of a process of establishing a session among a plurality of transmitting terminals according to an embodiment of the present invention;

FIG. 11 is a flowchart of an example of procedures of creating a participant information table according to an embodiment of the present invention;

FIG. 16 is a flowchart of an example of details of a layout determination process according to an embodiment of the present invention;

FIG. 17 is a flowchart of an example of procedures of creating a conference screen by a display control unit according to an embodiment of the present invention.

DETAILED DESCRIPTION OF THE PREFERRED EMBODIMENTS

In the TV conference system of the related art, when a terminal device cannot receive image data due to media control technology, etc., screen transitions occur frequently. Screen transitions in the TV conference system of the related art are described referring to FIG. 1.

Figure 1:
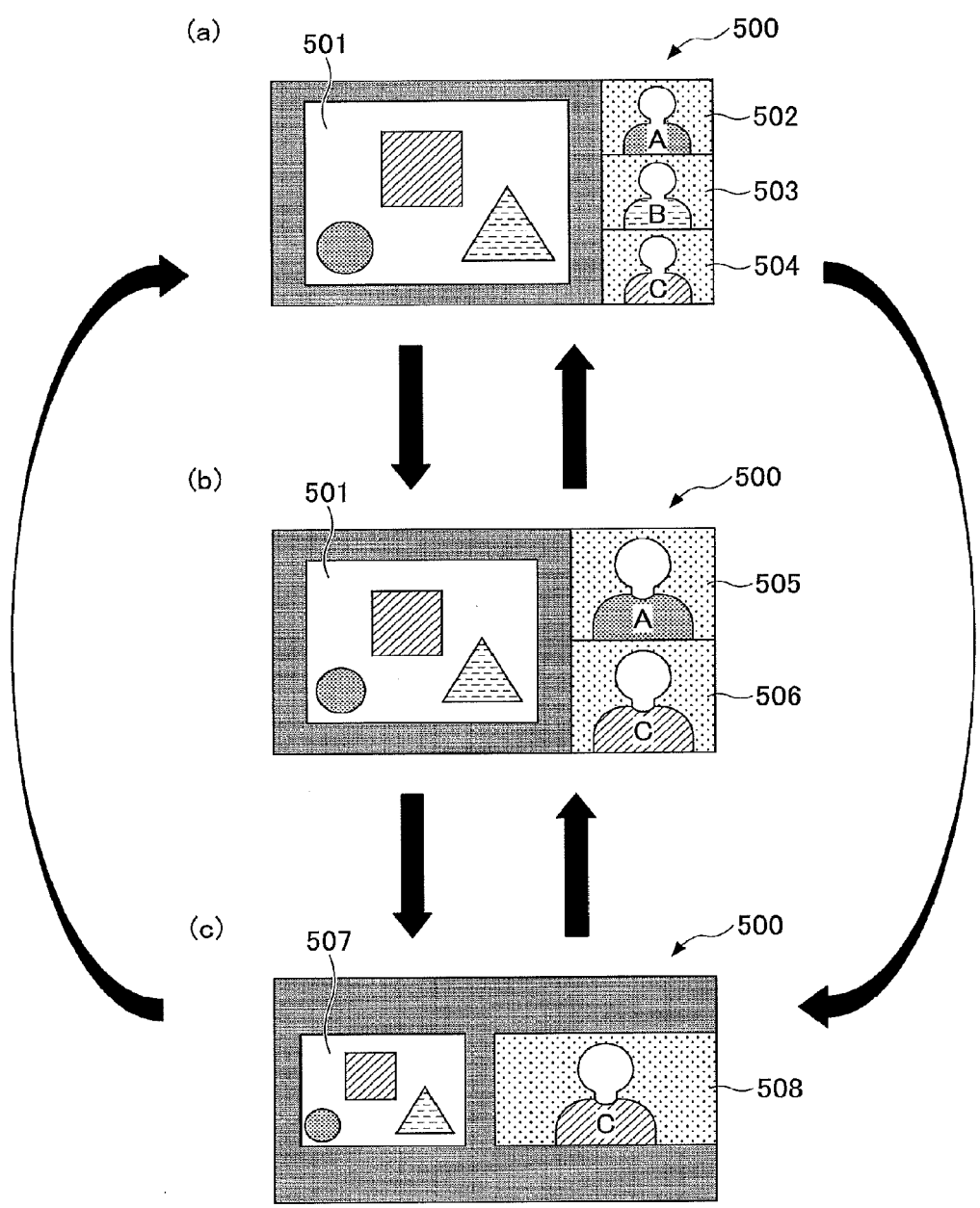
FIG. 1 is a diagram illustrating screen transitions of the related art.

FIG. 1 is a diagram illustrating screen transitions of the related art. A conference screen 500 of FIG. 1(a) is the starting point. The conference screen 500 of FIG. 1(a) includes four areas 501 through 504. Image data of location A is displayed in the area 502, image data of location B is displayed in the area 503, and image data of location C (own location) is displayed in the area 504. Furthermore, display data sent from any one of locations A through C (image of materials such as document data) is displayed in the area 501.

When the reception band decreases from the state of FIG. 1(a), the terminal device displays the conference screen 500 of FIG. 1(b). In FIG. 1(b), the image data that has been displayed in the area 503 in FIG. 1(a) is not displayed anymore, and only the areas 501, 505, and 506 are displayed. Alternatively, when the reception band decreases significantly from the state of FIG. 1(a), the terminal device displays the conference screen 500 of FIG. 1(c). In FIG. 1(c), the image data that has been displayed in the areas 502 and 503 in FIG. 1(a) is not displayed anymore, and only the areas 507 and 508 are displayed.

As described above, when the reception band decreases, and the number of locations displayed by the terminal device decreases, the layout (the image data of each location and the size and position of the display data) of the conference screen 500 changes. When the reception band improves, the screen changes in an opposite way to the above. Accordingly, screen transitions frequently occur, and therefore a user who is looking fixedly at the conference screen 500 will feel a sense of discomfort.

A problem to be solved by an embodiment of the present invention is to provide an information processing apparatus in which frequent screen transitions are reduced.

Embodiments of the present invention will be described by referring to the accompanying drawings.

Figure 2:
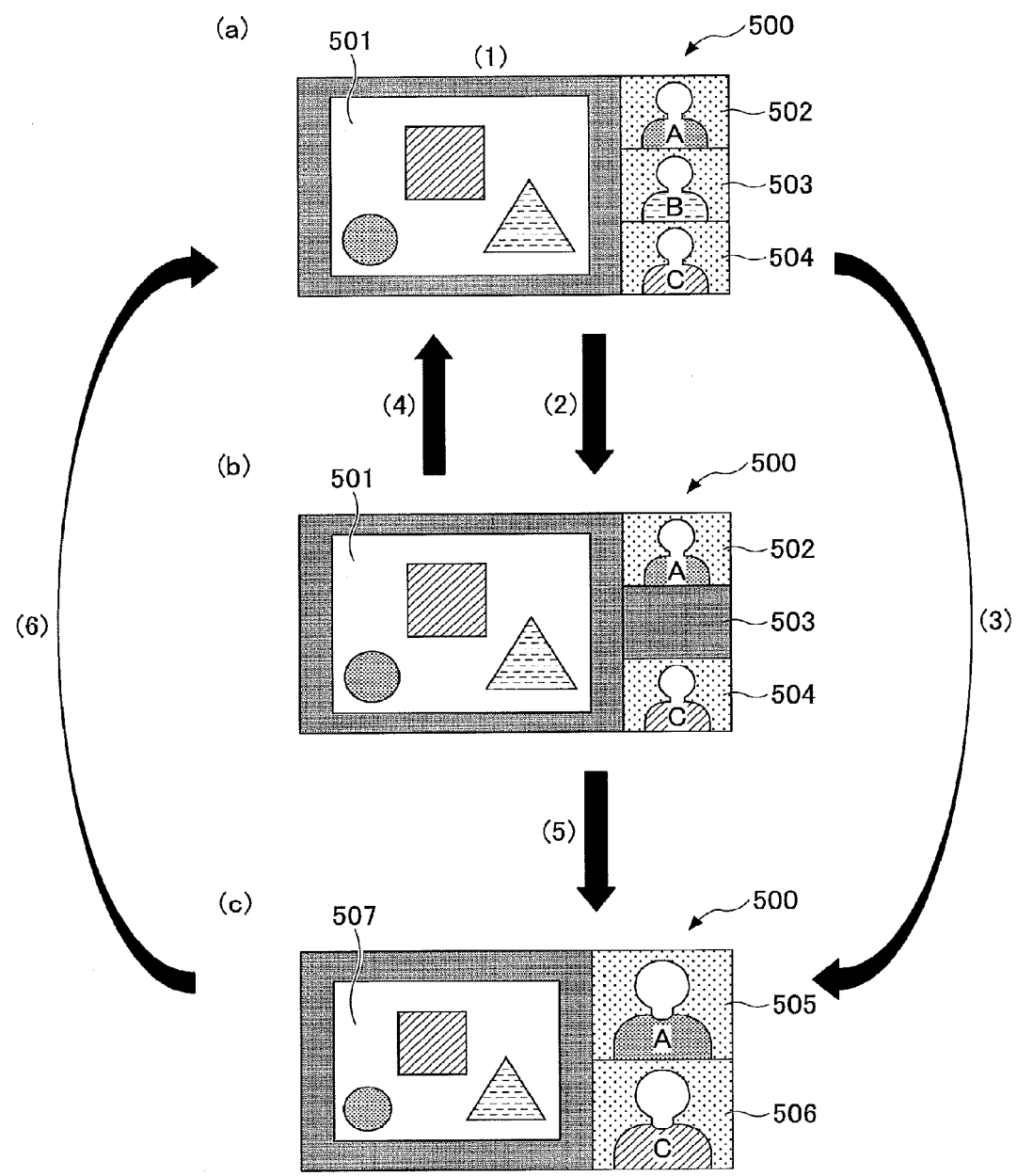
FIG. 2 is a diagram illustrating an example of screen transitions of a conference screen displayed by a transmitting terminal according to an embodiment of the present invention.

FIG. 2 is a diagram illustrating an example of screen transitions of the conference screen 500 according to an embodiment of the present invention. In the conference screen 500 of FIG. 2(a), display data sent from any one of locations A through C is displayed in the area 501, image data of location A is displayed in the area 502, image data of location B is displayed in the area 503, and image data of location C (own location) is displayed in the area 504. A description is given of screen transitions from the screen of FIG. 2(a), which is the starting point.

(1) When the number of displayed locations (display location number) decreases, the transmitting terminal determines whether a predetermined time has passed since the previous (last) layout change. That is, the transmitting terminal determines whether a predetermined time has passed since the layout has been changed from FIG. 2(c) to FIG. 2(a) or from FIG. 2(b) to FIG. 2(a).

(2) When the predetermined time has not passed, the transmitting terminal transitions to the conference screen 500 of FIG. 2(b). That is, when the number of displayed locations is decreased due to the decreases in the reception band, the layout of the conference screen 500 is not changed, but the image that has been displayed in the area 503 is not displayed anymore while maintaining the same layout. Note that the transmitting terminal determines the image data that is not to be displayed anymore based on a priority rank order set in advance. In FIG. 2(b), a substitute image is displayed in the area 503. The substitute image will be described below; in FIG. 2(b), a rectangular image having a uniform color (for example, black) is displayed as the substitute image.

(3) When a predetermined time has passed since the previous layout change, the transmitting terminal transitions to the conference screen 500 of FIG. 2(c). That is, the substitute image is not displayed anymore, and the conference screen 500 having a changed layout is displayed.

(4) When the reception band improves by the layout of FIG. 2(b), the transmitting terminal transitions to the conference screen 500 of FIG. 2(a). In this case, the layout does not change between FIG. 2(b) and FIG. 2(a), and therefore the user does not feel a sense of discomfort.

(5) When a predetermined time has passed since changing from FIG. 2(a) to FIG. 2(b), the transmitting terminal changes the layout according to the number of displayed locations. Therefore, when the number of displayed locations decreases due to the decreases in the reception band, the screen transition can be controlled such that the layout does not change unless a predetermined time has passed.

(6) When the reception band improves by the layout of FIG. 2(c), the transmitting terminal transitions to the conference screen 500 of FIG. 2(a). When the reception band improves, the transmitting terminal may immediately transition to the conference screen 500 of FIG. 2(a), or the transmitting terminal may transition to the conference screen 500 of FIG. 2(a) after a predetermined time passes after changing to the layout of FIG. 2(c).

As described above, by the transmitting terminal and the image display method according to the present embodiment, when the number of displayed locations is decreased, the layout of the conference screen 500 is changed after a predetermined time passes instead of immediately changing the layout. Therefore, frequent screen transitions can be reduced. As frequent changes in the layout are reduced, the sense of discomfort felt by the user can be reduced.

<Transmission and Reception of Images and Voice Sound by Transmission System>

Figure 3:
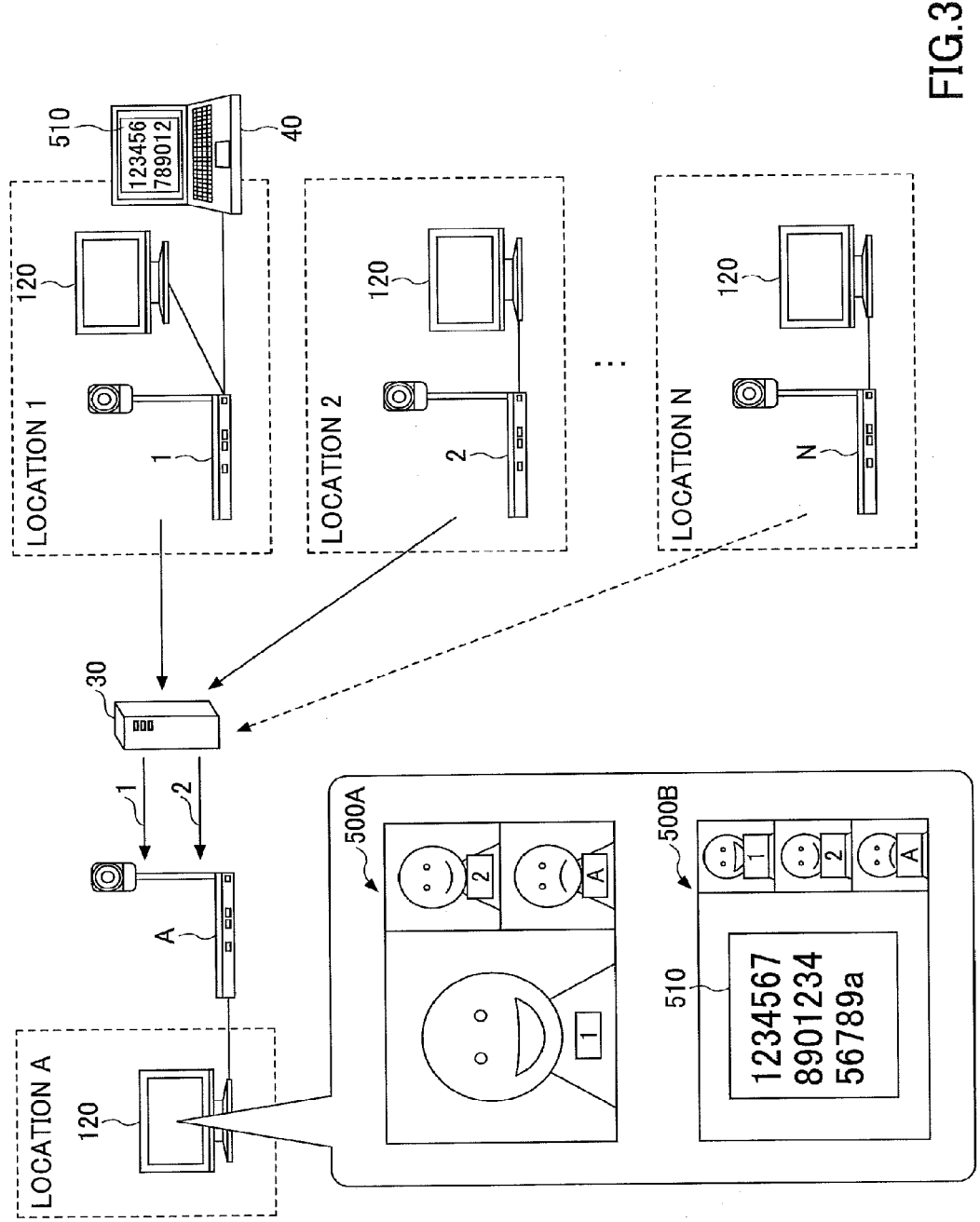
FIG. 3 is a schematic diagram illustrating transmission and reception of images and voice sound by a transmission system according to an embodiment of the present invention.

FIG. 3 is a schematic diagram illustrating the transmission and reception of images and voice sound by a transmission system 100 (see FIG. 4) according to an embodiment of the present invention. A transmitting terminal A is having a TV conference with transmitting terminals 1 through N at locations 1 through N. The location is the place where the transmitting terminal is located; however, there may be a plurality of transmitting terminals located at the same location (for example, in a conference room). In the present embodiment, as a matter of convenience, it is assumed that the number of locations and the number of transmitting terminals are the same.

Displays 120 are connected to the transmitting terminals A and 1 through N; however, in the following, a description is given of the conference screen 500 displayed on the display 120 of the transmitting terminal A. Furthermore, there may be a case where an information display device 40 is connected to any one of the transmitting terminals A and 1 through N. In FIG. 2, as a matter of convenience, the information display device 40 is connected to the transmitting terminal 1. The data displayed by the information display device 40 is referred to as display data 510.

The transmitting terminals A and 1 through N are connected to a relay device 30 in a network. The relay device 30 relays at least one kind of data among image data, voice sound data, and display data (hereinafter, at least one of image data, voice sound data, and display data is referred to as "content data"). Therefore, when the number of locations is 1+N as illustrated in FIG. 3, the relay device 30 sends a maximum of N content data items to the transmitting terminal A.

In a conference screen 500A in FIG. 3, the transmitting terminal A is simultaneously displaying two (<N) images (images of transmitting terminals 1 and 2; however, the images may be of any of the transmitting terminals 1 through N; furthermore, the image of the transmitting terminal A that is the own device is not counted) on the display 120. This number "2" is hereinafter referred to as a "display location number" (the number of locations that are displayed or to be displayed is referred to as a "display location number"). The transmitting terminal A is able to determine the number of image data items and display data items that can be displayed at the same time on the display 120, according to the reception band. In this case, the relay device 30 sends only the image data to be displayed by the transmitting terminal A to the transmitting terminal A. The number of locations, from which the transmitting terminal A receives content data items, is hereinafter referred to as a "reception location number". Therefore, display location number=reception location number is satisfied.

Furthermore, as in a conference screen 500B, when the transmitting terminal A starts displaying the display data 510, the relay device 30 sends the display data in addition to the content data of the transmitting terminals 1 and 2, to the transmitting terminal A.

As described above, the transmitting terminal A receives only the image data or the display data to be displayed on the display 120, and therefore wasteful usage of the reception band can be reduced.

<System Configuration>

Figure 4:
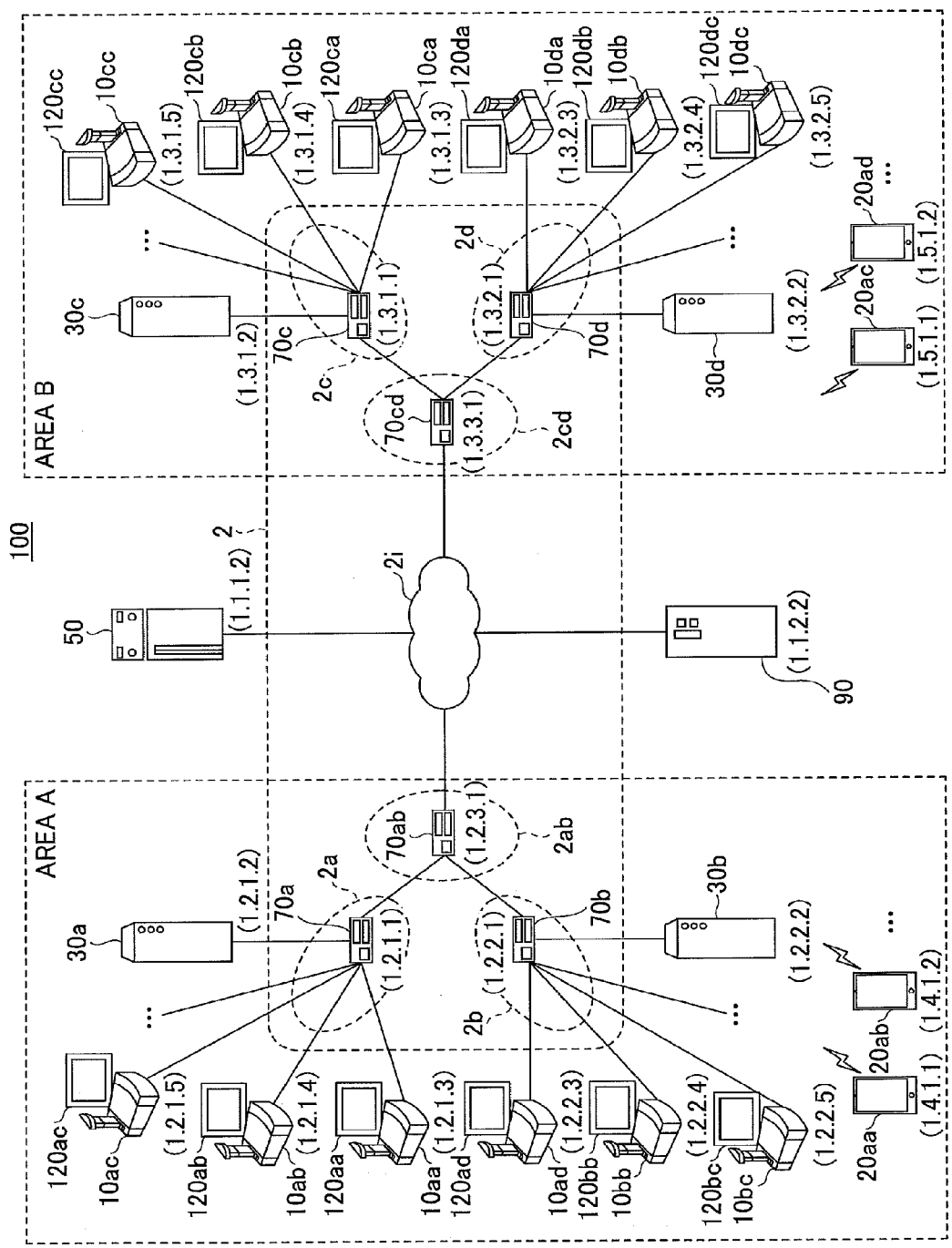
FIG. 4 is a schematic diagram illustrating an example of the transmission system according to an embodiment of the present invention.

FIG. 4 is a schematic diagram illustrating an example of the transmission system 100 according to an embodiment of the present invention. The transmission system 100 (example of a communication system) is a communication system for a plurality of transmitting terminals to communicate information and emotions to each other via a transmission management system 50. Examples of the transmission system 100 are a TV conference system, a videophone system, a voice sound conference system, a voice sound phone system, a Personal Computer (PC) screen sharing system, and a text chat system, etc. Furthermore, the transmission system 100 includes a data providing system for sending content data in one direction from one transmitting terminal to another transmitting terminal via the transmission management system 50.

In the present embodiment, a description is given of the transmission system 100 by which TV conferences can be held, as an example of a communication system.

The transmission system 100 illustrated in FIG. 4 includes a plurality of transmitting terminals (10aa, 10ab, and so on), a plurality of mobile terminals (20aa, 20ab, and so on), the displays (120aa, 120ab, and so on) for the transmitting terminals (10aa, 10ab, and so on), a plurality of relay devices (30a, 30b, and so on), the transmission management system 50, and a program providing system 90.

The plurality of transmitting terminals 10 send and receive image data and voice sound data that are examples of content data. The information display device 40 is omitted in FIG. 4. The plurality of transmitting terminals 10 are TV conference terminals that can use a TV conference service. In the present embodiment, the transmitting terminals 10 are assumed to be terminals that are exclusively used for TV conferences.

On the other hand, the plurality of mobile terminals 20 send and receive image data and voice sound data that are examples of content data. The mobile terminals 20 may be able to send and receive text data. That is, the plurality of mobile terminals 20 may be able to use text chat, in addition to TV conferences. In the present embodiment, unless otherwise mentioned, the mobile terminal 20 may be a tablet terminal, a mobile phone, a smartphone, a Personal Digital Assistant (PDA), a wearable PC, a game console, a general-purpose PC terminal, a car navigation terminal, an electronic whiteboard, a projector, a monitor camera, and an industrial device including a communication function, etc. Furthermore, the industrial device includes an office device such as a Multifunction Peripheral/Printer/Product (MFP), a medical device such as an endoscopic instrument, and an agricultural device such as a tilling machine. The wearable PC includes a watch and a head mount display, etc. Note that the mobile terminal 20 is wirelessly connected to a communication network 2, for example, via a mobile phone communication network or Wireless Fidelity (WiFi).

As it will be clear from the hardware configurations described below, the transmitting terminal 10 and the mobile terminal 20 are referred to as an information processing apparatus.

The transmitting terminal 10 and the mobile terminal 20 are managed by the transmission management system 50 for managing the call control of the transmission system 100.

Note that in the following, any one of the plurality of transmitting terminals (10aa, 10ab, and so on) is referred to as the "transmitting terminal 10" and any one of the mobile terminals (20aa, 20ab, and so on) is referred to as the "mobile terminal 20". The same applies to the display 120, the relay device 30, and a router 70.

Furthermore, one transmitting terminal 10 or mobile terminal 20 that sends a request to start a TV conference to another transmitting terminal 10 or mobile terminal 20 is referred to as a "request source terminal", and the terminal that is the destination to which the request is sent is referred to as a "destination terminal".

Furthermore, in the transmission system 100, between the request source terminal and the destination terminal, a management information session is established via the transmission management system 50. The management information session is for sending and receiving various kinds of management information. Furthermore, between the request source terminal and the destination terminal, a session for sending and receiving content data is established via the relay device 30. Note that the session for content data does not always have to be mediated by the relay device 30. The session for content data may be communicated via the transmission management system 50, or the session for content data may be directly communicated between the request source terminal and the destination terminal.

As described above, the relay device 30 relays the content data between the plurality of transmitting terminals 10 and the plurality of mobile terminals 20.

The transmission management system 50 implements call control between the transmitting terminals 10 or the mobile terminals 20. The transmission management system 50 also performs login authentication of the transmitting terminal 10 and the mobile terminal 20, manages a call status, manages a destination list, reports a transmission destination of content data to the relay device 30, and causes the relay device 30 to manage the call status.

The transmission management system 50 is an information processing apparatus; however, the transmission management system 50 may also be a monitor camera, an industrial device including a communication function, or a wearable PC, etc. Furthermore, the industrial device includes an office device such as a MFP, a medical device such as an endoscopic instrument, and an agricultural device such as a tilling machine. The wearable PC includes a watch and a head mount display, etc.

The program providing system 90 stores terminal-use programs in a Hard Disk (HD) 304 described below. The terminal-use programs are for causing the transmitting terminal 10 and the mobile terminal 20 to realize various functions. The program providing system 90 can send the terminal-use programs to the transmitting terminal 10 and the mobile terminal 20. The program providing system 90 also stores management-device-use programs in the HD 304 described below. The management-device-use programs are for causing the transmission management system 50 to realize various functions. The program providing system 90 can send the management-device-use programs to the transmission management system 50.

The transmitting terminals (10aa, 10ab, 10ac, and so on), the relay device 30a, and the router 70a are communicatively connected by a LAN 2a. The transmitting terminals (10ad, 10bb, 10bc, and so on), the mobile terminals (20aa, 20ab, and so on), the relay device 30b, and the router 70b are communicatively connected by a LAN 2b. Furthermore, the LAN 2a and the LAN 2b are communicatively connected by an exclusive-use line 2ab including the router 70ab, and the LAN 2a and the LAN 2b are constructed in a predetermined area A. For example, the area A is Japan, the LAN 2a is constructed in a business office in Tokyo, and the LAN 2b is constructed in a business office in Osaka. Furthermore, the mobile terminals (20aa, 20ab, and so on) are used in the area A.

On the other hand, the transmitting terminals (10ca, 10cb, 10cc, and so on), the relay device 30c, and the router 70c are communicatively connected by a LAN 2c. The transmitting terminals (10da, 10db, 10dc, and so on), the mobile terminals (20ac, 20ad, and so on), the relay device 30d, and the router 70d are communicatively connected by a LAN 2d. Furthermore, the LAN 2c and the LAN 2d are communicatively connected by an exclusive-use line 2cd including the router 70cd, and the LAN 2c and the LAN 2d are constructed in a predetermined area B. For example, the area B is the USA, the LAN 2c is constructed in a business office in New York, and the LAN 2d is constructed in a business office in Washington D.C. Furthermore, the mobile terminals (20ac, 20ad, and so on) are used in the area B.

Furthermore, the transmission management system 50 and the program providing system 90 are communicatively connected with the transmitting terminals 10, the mobile terminals 20, and the relay devices 30 via the Internet 2i. The transmission management system 50 or the program providing system 90 may be disposed in the area A or the area B or in another area.

Furthermore, in FIG. 4, the group of four numbers indicated below each of the transmitting terminals 10, the mobile terminals 20, the relay devices 30, the transmission management system 50, the routers 70, and the program providing system 90, indicate an IP address in a general IPv4 in a simplified manner.

<Communication Status of System>

Figure 5:
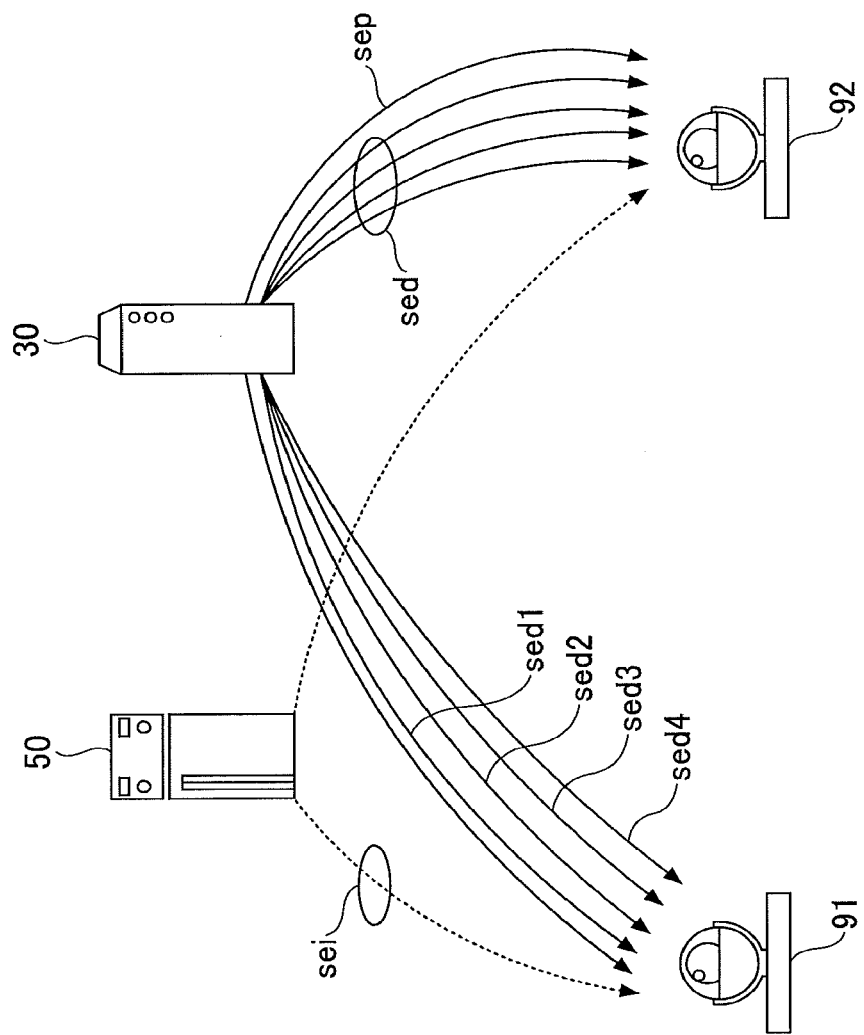
FIG. 5 is a diagram illustrating examples of sessions that are controlled by the transmission system according to an embodiment of the present invention.

FIG. 5 is a diagram illustrating examples of sessions that are controlled by the transmission system 100. As illustrated in FIG. 5, a session for management information sei is established between a request source terminal 91 and a destination terminal 92 in the transmission system 100. The session for management information sei is for sending and receiving various kinds of management information via the transmission management system 50. Furthermore, four sessions are established between the request source terminal 91 and the destination terminal 92, for sending and receiving four kinds of data via the relay device 30. The four kinds of data are high-resolution image data sed1, mid-resolution image data sed2, low-resolution image data sed3, and voice sound data sed4. These four sessions are collectively indicated as a session sed for image/voice sound data. Furthermore, streaming transmission sep for sending and receiving display data via the relay device 30 is performed between the request source terminal 91 and the destination terminal 92. A session for display data may also be established.

<Hardware Configuration>

<<Transmitting Terminal>>

Figure 6:
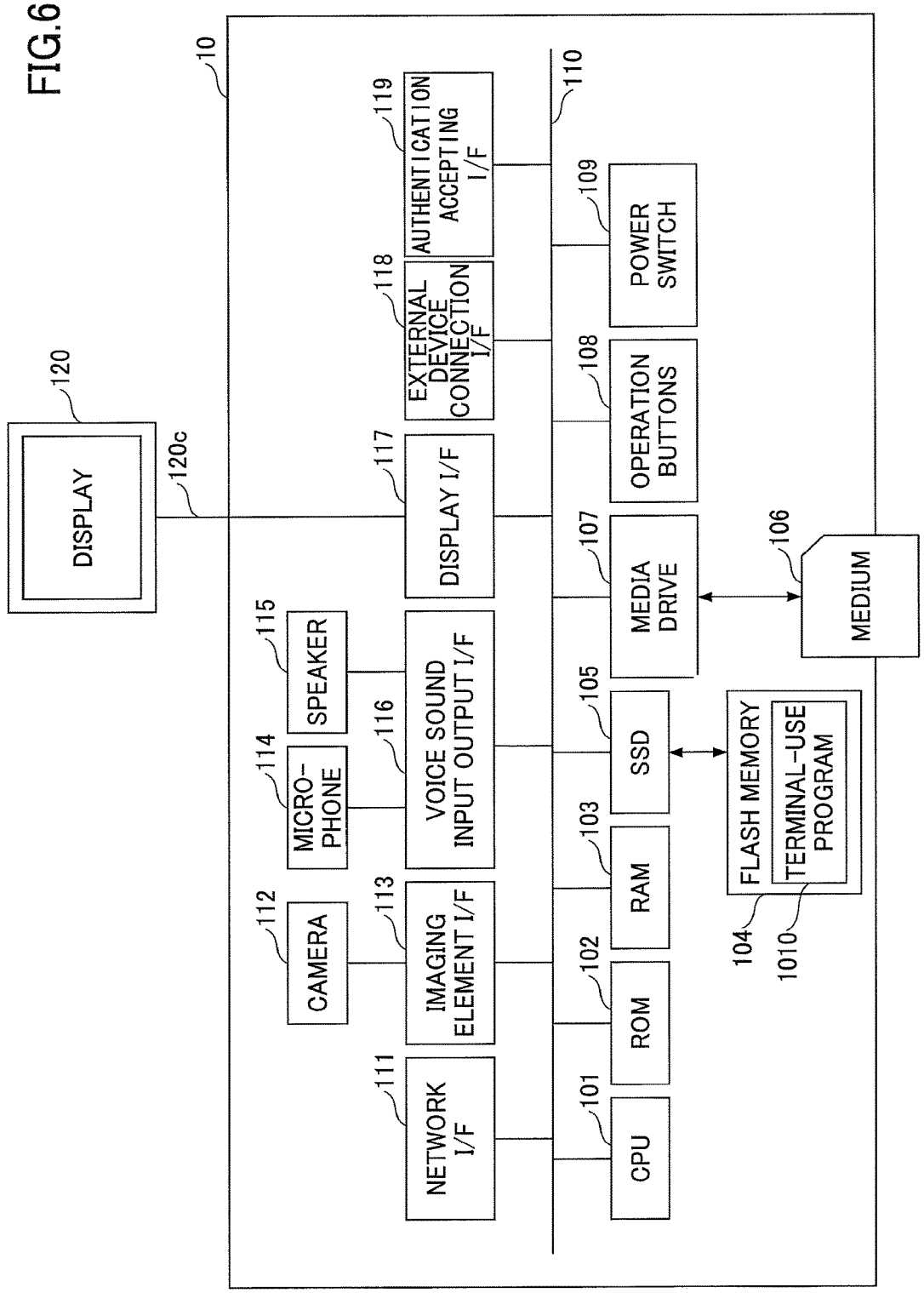
FIG. 6 is a block diagram illustrating a hardware configuration of the transmitting terminal according to an embodiment of the present invention.

Next, referring to FIG. 6, a description is given of a hardware configuration of the transmitting terminal 10. FIG. 6 is a block diagram illustrating a hardware configuration of the transmitting terminal 10 according to an embodiment of the present invention. As illustrated in FIG. 6, the transmitting terminal 10 according to the present embodiment includes a Central Processing Unit (CPU) 101 for controlling operations of the entire transmitting terminal 10. Furthermore, the transmitting terminal 10 includes a Read-Only Memory (ROM) 102 storing programs used for driving the CPU 101 such as an Initial Program Loader (IPL), etc., and a Random Access Memory (RAM) 103 used as a work area of the CPU 101. Furthermore, the transmitting terminal 10 includes a flash memory 104 storing various kinds of data such as a terminal-use program 1010, image data, and voice sound data, etc. Furthermore, the transmitting terminal 10 includes a Solid State Drive (SSD) 105 for controlling the reading or the writing of various kinds of data with respect to the flash memory 104, under the control of the CPU 101. Furthermore, the transmitting terminal 10 includes a media drive 107 for controlling the reading or the writing (storing) of data with respect to a recording medium 106 such as a flash memory, etc., and operation buttons 108 that are operated when selecting a destination at the transmitting terminal 10. Furthermore, the transmitting terminal 10 includes a power switch 109 for switching ON/OFF the power source of the transmitting terminal 10, and a network interface (I/F) 111 for performing data transmission by using the communication network 2.

Furthermore, the transmitting terminal 10 includes a built-in camera 112 for capturing an image of a subject and obtaining image data under the control of the CPU 101, an imaging element I/F 113 for controlling the driving of the camera 112, and a built-in microphone 114 for inputting voice sound. Furthermore, the transmitting terminal 10 includes a built-in speaker 115 for outputting voice sound, and a voice sound input output I/F 116 for processing the input and output of voice sound signals between the microphone 114 and the speaker 115 under the control of the CPU 101. Furthermore, the transmitting terminal 10 includes a display I/F 117 for transmitting image data to an external display 120 under the control of the CPU 101 and an external device connection I/F 118 for connecting various external devices. Furthermore, the transmitting terminal 10 includes an authentication accepting I/F 119 and a bus line 110 such as an address bus and a data bus, etc., for electrically connecting the above elements as illustrated in FIG. 6.

The display 120 is a display device including a liquid crystal display or an organic electro-luminescence (EL) display for displaying an image of a subject and icons used for operation, etc. Furthermore, the display 120 is connected to the display I/F 117 via a cable 120c. The display 120 of the transmitting terminal 10 is connected to the display I/F 117 by the cable 120c; however, the display 120 is not so limited. The display 120 may be built in the transmitting terminal 10.

To the external device connection I/F 118, external devices such as an external camera, an external microphone, and an external speaker, etc., can be connected by a Universal Serial Bus (USB) cable, etc.

The authentication accepting I/F 119 is an interface for accepting input of authentication information from a user. Specifically, the authentication accepting I/F 119 may be a reading device such as an integrated circuit (IC) card reader (for example, a Near Field Communication (NFC) card reader), a Secure Digital (SD) card reader, and a Subscriber Identity Module (SIM) card reader, etc.

Furthermore, the terminal-use program 1010 may be recorded in and distributed by a computer-readable recording medium such as the recording medium 106 in a file having an installable format or an executable format. Furthermore, the terminal-use program 1010 may be stored in the ROM 102 instead of the flash memory 104.

The hardware configuration of the mobile terminal 20 and the hardware configuration of the transmitting terminal 10 have overlapping parts, and even if there were any differences, it is assumed that there will be no problem in constructing the transmission system 100.

<<Transmission Management System, Relay Device, and Program Providing System>>

Figure 7:
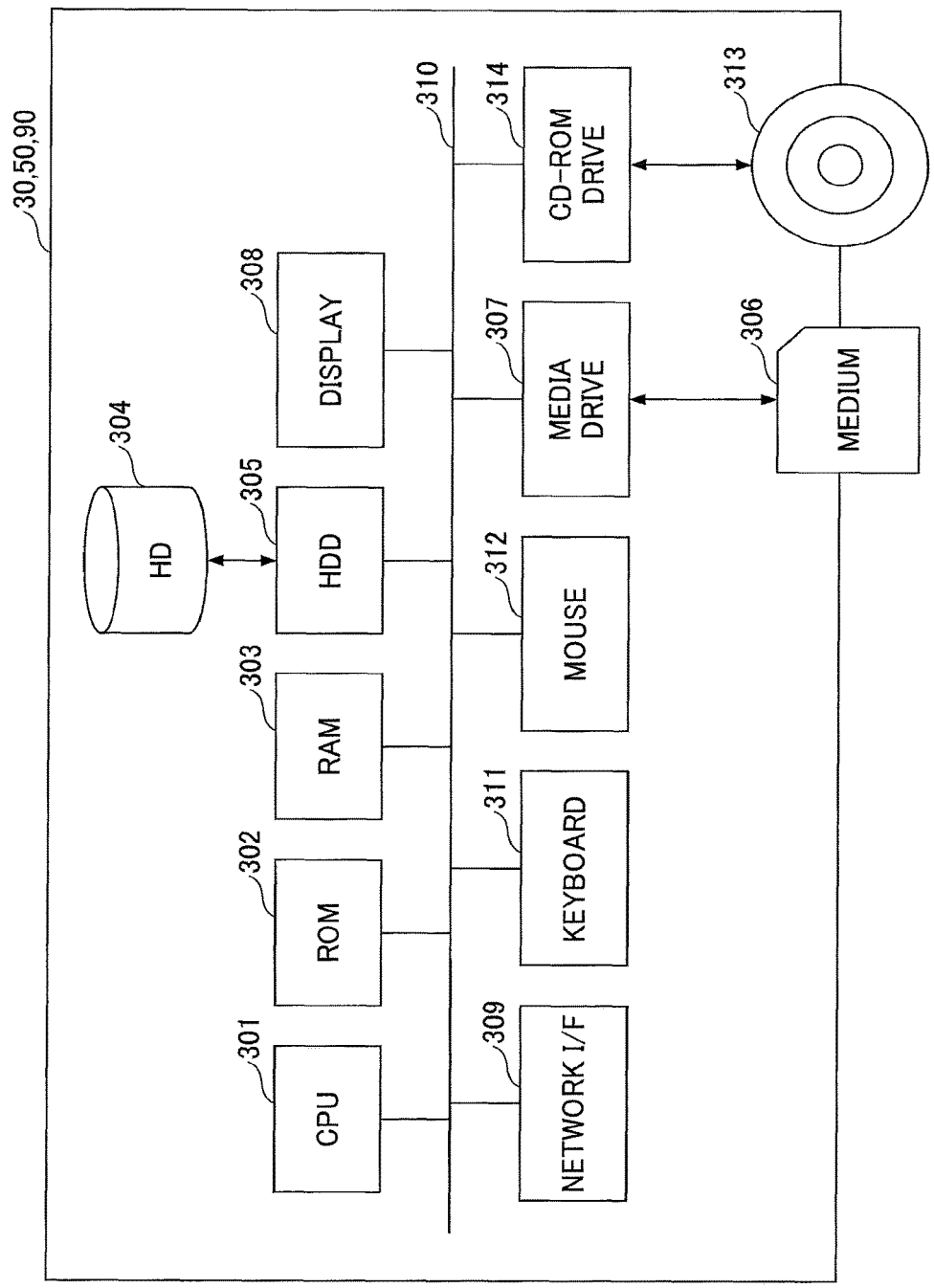
FIG. 7 is a block diagram illustrating a hardware configuration of a transmission management system according to an embodiment of the present invention.

Next, referring to FIG. 7, a description is given of a hardware configuration of the transmission management system 50. FIG. 7 is a block diagram illustrating a hardware configuration of the transmission management system 50 according to an embodiment of the present invention.

Note that the illustrated hardware configuration of the transmission management system 50, etc., does not need to be stored in a single housing or does not need to be provided as a single device. The illustrated hardware configuration indicates hardware elements that are preferably included in the transmission management system 50, etc. Furthermore, in order to accommodate cloud computing, the physical configuration of the transmission management system 50, etc., according to the present embodiment does not have to be fixed. The hardware resources may be dynamically connected or cut off according to the load.

The transmission management system 50 includes a CPU 301 for controlling the operations of the entire transmission management system 50, a ROM 302 storing programs used for driving the CPU 301 such as an IPL, and a RAM 303 used as a work area of the CPU 301. Furthermore, the transmission management system 50 includes the HD 304 for storing various kinds of data such as management device-use programs, etc., and a Hard Disk Drive (HDD) 305 for controlling the reading or the writing of various kinds of data with respect to the HD 304 under the control of the CPU 301. Furthermore, the transmission management system 50 includes a media drive 307 for controlling the reading or the writing (storing) of data with respect to a recording medium 306 such as a flash memory, etc., and a display 308 for displaying various kinds of information such as a cursor, a menu, a window, characters, or images. Furthermore, the transmission management system 50 includes a network I/F 309 for performing data transmission by using the communication network 2, a keyboard 311 including a plurality of keys for inputting characters, values, and various instructions, and a mouse 312 for selecting and executing various instructions, selecting a processing target, and moving the cursor. Furthermore, the transmission management system 50 includes a Compact Disc Read-Only Memory (CD-ROM) drive 314 for controlling the reading or the writing of various kinds of data with respect to a CD-ROM 313 that is an example of a removable recording medium. Furthermore, the transmission management system 50 includes a bus line 310 such as an address bus and a data bus, etc., for electrically connecting the above elements as illustrated in FIG. 7.

Furthermore, the management device-use program may be recorded in and distributed by a computer-readable recording medium such as the recording medium 306 or the CD-ROM 313 in a file having an installable format or an executable format. Furthermore, the management device-use program may be stored in the ROM 302 instead of the HD 304.

Furthermore, the hardware configuration of the relay device 30 and the program providing system 90 is the same as the hardware configuration of the transmission management system 50 described above, and is thus not described.

<Functional Configuration of Transmission System>

Figure 8:
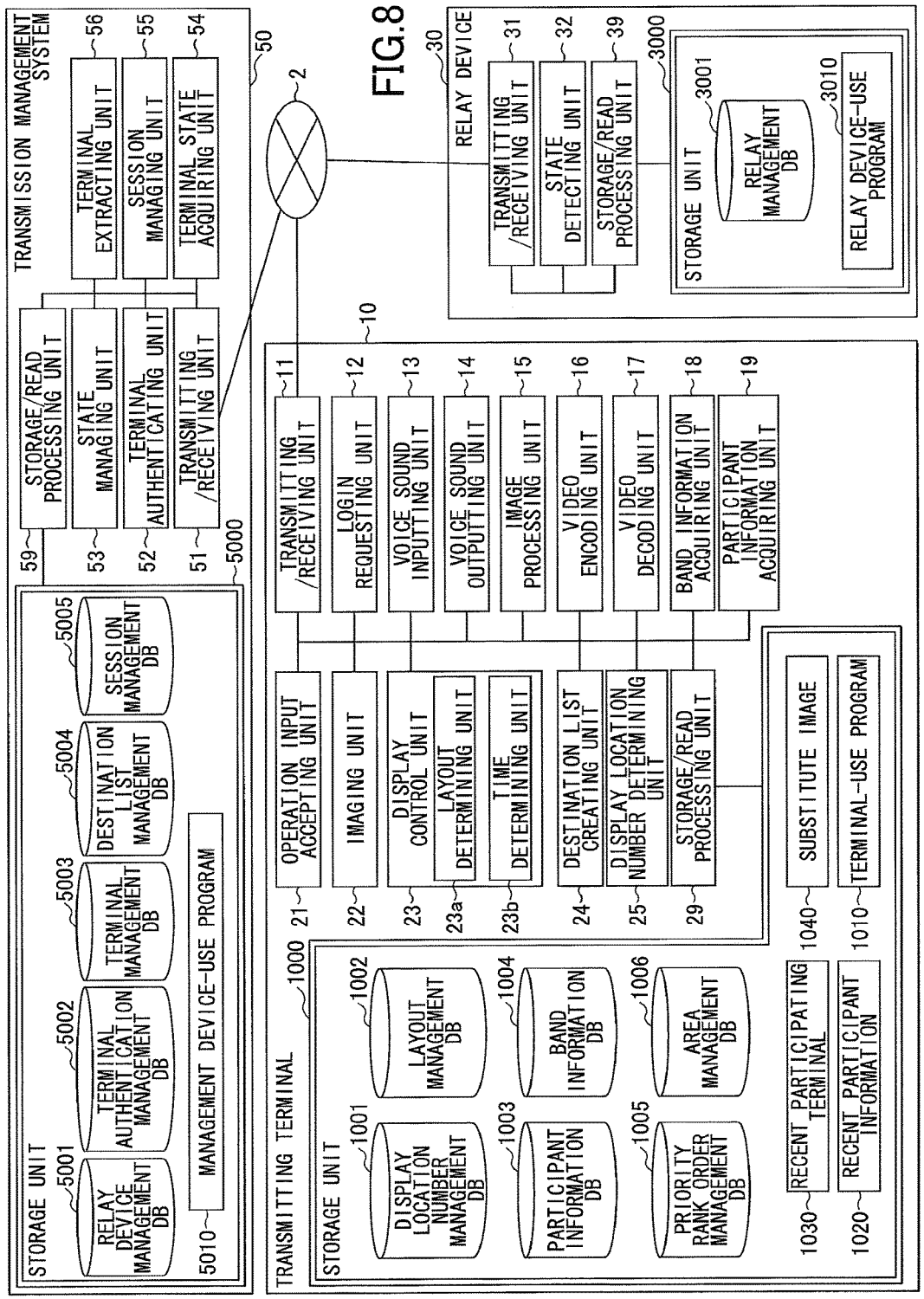
FIG. 8 is a functional block diagram of the transmission management system, the transmitting terminal, and the relay device included in the transmission system according to an embodiment of the present invention.

Next, referring to FIG. 8, a description is given of a functional configuration of the transmission system 100 according to the present embodiment. FIG. 8 is a functional block diagram of the transmission management system 50, the transmitting terminal 10, and the relay device 30 included in the transmission system 100 according to an embodiment of the present invention. In FIG. 8, the transmitting terminal 10, the relay device 30, and the transmission management system 50 are data-communicatively connected via the communication network 2. Furthermore, the program providing system 90 illustrated in FIG. 4 is omitted in FIG. 8 since the program providing system 90 is not directly related to the communication in a TV conference.

<<Functional Configuration of Transmitting Terminal>>

The transmitting terminal 10 includes a transmitting/receiving unit 11, a login requesting unit 12, a voice sound inputting unit 13, a voice sound outputting unit 14, an image processing unit 15, a video encoding unit 16, a video decoding unit 17, a band information acquiring unit 18, a participant information acquiring unit 19, an operation input accepting unit 21, an imaging unit 22, a display control unit 23, a destination list creating unit 24, a display location number determining unit 25, and a storage/read processing unit 29. These units are functions that are realized or means that are provided as any of the elements illustrated in FIG. 6 operates in response to an instruction from the CPU 101 according to the terminal-use program 1010 loaded in the RAM 103 from the flash memory 104.

Furthermore, the transmitting terminal 10 includes a storage unit 1000 that is constructed by the RAM 103, the ROM 102, and the flash memory 104 illustrated in FIG. 6. The storage unit 1000 stores a display location number management Data Base (DB) 1001, a layout management DB 1002, a participant information DB 1003, a band information DB 1004, a priority rank order management DB 1005, an area management DB 1006, a recent participating terminal 1030, recent participant information 1020, a substitute image 1040, and the terminal-use program 1010. The storage unit 1000 is an example of a storage.

The recent participating terminal 1030 is information that is referred to when determining whether to change the layout. The changes in the number of participating terminals are repeatedly monitored in cycles, and the recent participating terminal 1030 indicates the number of participating terminals detected in the previous cycle (participating terminals are described below). The recent participant information 1020 is information referred to when determining whether to change the layout. The changes in the participant information are repeatedly monitored in cycles, and the recent participant information 1020 indicates a participant information table or information equivalent to the participant information table detected in the previous cycle. The substitute image 1040 is an image (still image or video). When the image data or display data, which has been displayed by the transmitting terminal 10, cannot be received anymore, the substitute image 1040 is displayed in the area where the image data or display data that cannot be received anymore has been displayed.

In the following, a description is given of the databases.

TABLE 1

DISPLAY LOCATION NUMBER MANAGEMENT TABLE

| RECEPTION BAND | DISPLAY LOCATION NUMBER |
|---|---|
| 0 Kbps~200 Kbps | 1 LOCATION |
| 200 Kbps~400 Kbps | 2 LOCATIONS |
| . | . |
| . | . |
| . | . |

The display location number management DB 1001 including a display location number management table is constructed in the storage unit 1000. In the display location number management table, the display location number is managed in association with a reception band. As the reception band increases, the display location number (the number of locations that can be displayed at the same time) increases. For example, in a reception band of "0 kilobits per second (kbps) through 200 kbps", the display location number is 1. In a reception band of "200 kbps through 400 kbps", the display location number is 2.

TABLE 2

LAYOUT MANAGEMENT TABLE

| DISPLAY LOCATION NUMBER | DISPLAY LOCATION | HORIZONTAL DIRECTION STARTING POINT | HORIZONTAL DIRECTION ENDING POINT | VERTICAL DIRECTION STARTING POINT | VERTICAL DIRECTION ENDING POINT |
|---|---|---|---|---|---|
| 1 LOCATION | FIRST LOCATION | 0% | 100% | 0% | 100% |
| 2 LOCATIONS | FIRST LOCATION | 0% | 50% | 0% | 100% |
|  | SECOND LOCATION | 50% | 100% | 0% | 100% |
| . | . | . | . | . | . |
| . | . | . | . | . | . |
| . | . | . | . | . | . |

The layout management DB 1002 including a layout management table is constructed in the storage unit 1000. In the layout management table, a display location, a horizontal direction starting point, a horizontal direction ending point, a vertical direction starting point, and a vertical direction ending point are managed in association with a display location number. For example, when the display location number is 1, the image data of the corresponding location is displayed from a starting point of 0% in the horizontal direction and the vertical direction of the display 120 to an ending point of 100% in the horizontal direction and the vertical direction of the display 120. That is, the entire display is occupied by a single image data item.

TABLE 3

PARTICIPANT INFORMATION TABLE

| PARTICIPATING TERMINAL | IMAGE RECEPTION | VOICE SOUND RECEPTION | DISPLAY DATA RECEPTION |
|---|---|---|---|
| TRANSMITTING TERMINAL 01ab | Bp: RECEIVED | Bv: RECEIVED | Bd: NOT RECEIVED |
| TRANSMITTING TERMINAL 01ac | Cp: RECEIVED | Cv: RECEIVED | Cd: NOT RECEIVED |

TABLE 3-continued

PARTICIPANT INFORMATION TABLE

| PARTICIPATING TERMINAL | IMAGE RECEPTION | VOICE SOUND RECEPTION | DISPLAY DATA RECEPTION |
|---|---|---|---|
| TRANSMITTING TERMINAL 01ad | Dp: NOT RECEIVED | Dv: NOT RECEIVED | Dd: NOT RECEIVED |

The participant information DB 1003 including a participant information table is constructed in the storage unit 1000. In the participant information table, identification information of image reception, voice sound reception, display data reception; and indications of whether these data items are received, are associated with each participating terminal. The participating terminal is a transmitting terminal that has established a session. The participating terminal is in a state where at least one of reception and transmission of content data is possible; however, the participating terminal may not necessarily be performing reception or transmission.

In an example of the transmitting terminal 10*ab* (communication ID is 01ab), Bp is the image data ID of the transmitting terminal 10*ab*, Bv is the voice sound data ID of the transmitting terminal 10*ab*, and Bd is the display data ID of the transmitting terminal 10*ab*. That is, Bp is identification information used by another transmitting terminal 10 and the relay device 30 for uniquely identifying the image data sent by the transmitting terminal 10*ab*. Bv is identification information used by another transmitting terminal 10 and the relay device 30 for uniquely identifying the voice sound data sent by the transmitting terminal 10*ab*. Bd is identification information used by another transmitting terminal 10 and the relay device 30 for uniquely identifying the display data sent by the transmitting terminal 10*ab*. In the following, when identification information of image reception, identification information of voice sound reception, and identification information of display data reception are not particularly distinguished, the identification information is referred to as "data ID". The method of creating a participant information table will be described by referring to FIG. 11.

Note that an ID used in the present embodiment indicates identification information such as a language, a character, a symbol, or various marks, etc., used for uniquely identifying the target to be identified. Furthermore, a communication ID and a relay device ID may be identification information including a combination of at least two of a language, a character, a symbol, and various marks.

TABLE 4

BAND INFORMATION TABLE

|  | IMAGE | VOICE SOUND | DISPLAY DATA | TOTAL |
|---|---|---|---|---|
| TRANSMISSION BAND [Kbps] | 1200 | 72 | 0 | 1272 |
| RECEPTION BAND [Kbps] | 200 | 72 | 0 | 272 |

The band information DB 1004 including a band information table is constructed in the storage unit 1000. In the band information table, the bands of images, voice sound, display data, and total are registered with respect to transmission and reception. For example, as the reception band for images, 200 kbps is secured, and the images of the present number of locations are appropriately received. The band information table is preferably cyclically updated. Alternatively, the band information table is updated according to need so as not to exceed the maximum update period.

TABLE 5

PRIORITY RANK ORDER TABLE

| PRIORITY RANK ORDER | TRANSMITTING TERMINAL |
|---|---|
| 1 | 01ab |
| 2 | 01ac |
| 3 | 01ad |
| . | . |
| . | . |
| . | . | is The priority rank order management DB 1005 including a priority rank order table is constructed in the storage unit 1000. In the priority rank order table, the transmitting terminals 10*ab* through 10*ad*, etc., (communication IDs of participating terminals other than own device) are registered in association with priority rank orders. As the value of the priority rank order becomes smaller (that is, as the priority rank order becomes higher), the image data of the corresponding transmitting terminal 10 is displayed with higher priority on the display 120. The relay device 30 updates the priority rank order table, such that the priority rank order increases for the transmitting terminal 10 at another location that has sent voice sound data. Therefore, in the priority rank order table, the priority rank order tends to be higher for a location (transmitting terminal 10) that has recently emitted voice sound. Accordingly, the transmitting terminal 10 can easily display the image data of a location (transmitting terminal 10) that frequently emits voice sound, on the display 120.

The relay device 30 creates the priority rank order table by receiving voice sound data. The relay device 30 sends the priority rank order table to the transmitting terminal 10, directly or via the transmission management system 50. Accordingly, the transmitting terminal 10 is able to determine which image to arrange in which area in the conference screen 500, based on the priority rank order table. Note that the transmitting terminal 10 that is not a participating terminal anymore (for example, the transmitting terminal 10 that has logged out) is deleted from the priority rank order table.

Furthermore, the display data ID may be registered in the priority rank order table, instead of the communication ID. The display data may be handled similarly to the image data.

TABLE 6

AREA MANAGEMENT TABLE

| AREA | DATA ID |
|---|---|
| I (501) | Dd |
| II (502) | Bp |
| III (503) | Cp |
| IV (504) | OWN LOCATION |

The area management DB 1006 including an area management table is constructed in the storage unit 1000. In the area management table, data IDs are registered in association with areas I through IV of the conference screen 500. The values in parenthesis indicated with respect to the areas I through IV are codes. In the area management table, the image data ID of the image data or the display data ID of the display data that is presently displayed in each of the areas in the conference screen 500, is registered. Therefore, the transmitting terminal 10 that is sending the image data or display data can be identified.

Note that in the above descriptions, the information is referred to as a DB or a table as a matter of convenience; however, the information stored in the storage unit 1000 does not have to be stored in the form of a DB or a table. The same applies to the following descriptions.

(Functional Configuration of Transmitting Terminal)

Next, referring to FIGS. 6 and 8, a detailed description is given of the functional configuration of the transmitting terminal 10. The transmitting/receiving unit 11 of the transmitting terminal 10 is realized by instructions from the CPU 101 and the network I/F 111 illustrated in FIG. 6. The transmitting/receiving unit 11 sends and receives various kinds of data with the relay device 30 and the transmission management system 50 via the communication network 2. The transmitting/receiving unit 11 starts receiving state information indicating the state of each of the terminals that are candidate destinations, from the transmission management system 50, before starting communication with the desired destination terminal. Note that the state information does not only indicate the operating state of each transmitting terminal 10 (whether the transmitting terminal 10 is online or offline), but also indicates detailed states such as whether the transmitting terminal 10 is online and is also performing communication or whether the user is away from the transmitting terminal 10, etc. The transmitting/receiving unit 11 is an example of a receiver.

The login requesting unit 12 is realized by instructions from the CPU 101 illustrated in FIG. 6. The login requesting unit 12 is triggered by the acceptance of the power being turned on, to automatically send login request information from the transmitting/receiving unit 11 to the transmission management system 50 via the communication network 2. The login request information indicates a request to log in and the IP address of the request source terminal at the present time point. Furthermore, when the user turns the power switch 109 off from the on state, the transmitting/receiving unit 11 sends state information indicating to turn off the power to the transmission management system 50, and then the operation input accepting unit 21 completely turns off the power. Accordingly, the transmission management system 50 is able to recognize that the transmitting terminal 10 has switched to power off from power on.

The voice sound inputting unit 13 is realized by instructions from the CPU 101 and the voice sound input output I/F 116 illustrated in FIG. 6. After the user's voice sound is converted into voice sound signals by the microphone 114, the voice sound inputting unit 13 inputs voice sound data relevant to the voice sound signals.

The voice sound outputting unit 14 is realized by instructions from the CPU 101 and the voice sound input output I/F 116 illustrated in FIG. 6. The voice sound outputting unit 14 outputs voice sound signals relevant to voice sound data to the speaker 115, and causes the speaker 115 to output voice sound.

The image processing unit 15 is realized by instructions from the CPU 101 illustrated in FIG. 6. The image processing unit 15 performs image processing on the images and display data (when display data is to be sent) to be sent by the transmitting terminal 10. For example, the image processing unit 15 performs a noise process, increases the clarity, and adjusts the aspect ratio, etc.

The video encoding unit 16 is realized by instructions from the CPU 101 and the display I/F 117 illustrated in FIG. 6, etc. The video encoding unit 16 encodes (including compressing and encrypting) the images and display data to be sent by the transmitting terminal 10. Note that the video encoding unit 16 also encodes voice sound.

The video decoding unit 17 is realized by instructions from the CPU 101 and the display I/F 117 illustrated in FIG. 6, etc. The video decoding unit 17 decodes (including decompressing and decrypting) the image data and display data received by the transmitting terminal 10. Note that the video decoding unit 17 also decodes voice sound.

The band information acquiring unit 18 is realized by instructions from the CPU 101 and the network I/F 111 illustrated in FIG. 6. The band information acquiring unit 18 acquires the present reception band and transmission band in the communication network 2. The reception band and transmission band are registered in the band information table. For example, the band information acquiring unit 18 measures the average communication speed with the transmission management system 50 and the relay device 30, and acquires band information from the transmission management system 50 and the relay device 30. Instead of applying the actual communication speed as the band that can be used, for example, the band information acquiring unit 18 may obtain the maximum communication speed within a certain period, and apply the obtained value as the band that can be used.

The participant information acquiring unit 19 is realized by instructions from the CPU 101 illustrated in FIG. 6. The participant information acquiring unit 19 acquires information relevant to the terminals participating in the present conference, and registers the information in the participant information table in the participant information DB 1003. The information registered in the participant information table is acquired from the transmission management system 50 and the relay device 30.

The operation input accepting unit 21 is realized by instructions from the CPU 101, the operation buttons 108, and the power switch 109 illustrated in FIG. 6. The operation input accepting unit 21 accepts various kinds of input by the user. For example, when the user switches the power switch 109 illustrated in FIG. 6 to a power-on state, the operation input accepting unit 21 illustrated in FIG. 8 accepts the instruction for power-on and turns on the power.

The imaging unit 22 is realized by instructions from the CPU 101, the camera 112, and the imaging element I/F 113 illustrated in FIG. 6. The imaging unit 22 captures an image of a subject, and outputs image data obtained by capturing the image.

The display control unit 23 is realized by instructions from the CPU 101 and the display I/F 117 illustrated in FIG. 6. The display control unit 23 generates the conference screen 500 and implements control to send image data to the display 120. The display control unit 23 is an example of a display processor. Furthermore, the display control unit 23 includes a layout determining unit 23a and a time determining unit 23b. The layout determining unit 23a determines the layout of the conference screen 500 based on the display location number. The layout determining unit 23a is an example of a layout determiner. The time determining unit 23b determines whether a predetermined time has passed since the layout has been changed last. The time determining unit 23b is an example of a time determiner. The display control unit 23 creates the conference screen 500 according to the layout determined by the layout determining unit 23a.

The destination list creating unit 24 is realized by instructions from the CPU 101 illustrated in FIG. 6. The destination list creating unit 24 creates and updates a destination list based on the state information of the transmitting terminals 10 that are candidate destinations received from the transmission management system 50. In the destination list, the states of the transmitting terminals 10 that are candidate destinations are indicated by icons.

The display location number determining unit 25 is realized by instructions from the CPU 101 illustrated in FIG. 6. The display location number determining unit 25 refers to the display location number management table based on the present communication status (mainly the reception band), and determines the display location number. The display location number determining unit 25 is an example of a display number determiner.

Furthermore, the storage/read processing unit 29 is realized by instructions from the CPU 101 and the SSD 105 illustrated in FIG. 6. The storage/read processing unit 29 stores various kinds of data in the storage unit 1000 and performs processes of reading various kinds of data stored in the storage unit 1000. Note that in the storage unit 1000, information other than the information illustrated in FIG. 8 is stored. For example, every time image data, voice sound data, or display data is received from a destination terminal during a call, the received data is used to overwrite the stored data.

<<Functional Configuration of Transmission Management System>>

The transmission management system 50 includes a transmitting/receiving unit 51, a terminal authenticating unit 52, a state managing unit 53, a terminal state acquiring unit 54, a session managing unit 55, a terminal extracting unit 56, and a storage/read processing unit 59. These units are functions that are realized or means that are provided as any of the elements illustrated in FIG. 7 operates in response to an instruction from the CPU 301 according to a management device-use program 5010 loaded in the RAM 303 from the HDD 305.

Furthermore, the transmission management system 50 includes a storage unit 5000 that is constructed by the HDD 305, the RAM 303, and the ROM 302, etc., illustrated in FIG. 7. Various databases stored in the storage unit 5000 are described below.

TABLE 7

RELAY DEVICE MANAGEMENT TABLE

| RELAY DEVICE ID | OPERATING STATE | RECEPTION TIME AND DATE | IP ADDRESS OF RELAY DEVICE | MAXIMUM DATA TRANSMISSION SPEED (Mbps) |
|---|---|---|---|---|
| 111a | ONLINE | 2013.11.10.13:00 | 1.2.1.2 | 100 |
| 111b | ONLINE | 2013.11.10.13:10 | 1.2.2.2 | 1000 |
| 111c | OFFLINE | 2013.11.10.13:20 | 1.3.1.2 | 100 |
| 111d | ONLINE | 2013.11.10.13:30 | 1.3.2.2 | 10 |

A relay device management DB 5001 including a relay device management table is constructed in the storage unit 5000. In the relay device management table, the operating state of each relay device 30, the reception time and date at which the state information indicating the operating state has been received at the transmission management system 50, the IP address of the relay device 30, and the maximum data transmission speed (Mbps) in the relay device 30 are managed in association with the relay device ID of each of the relay devices 30.

TABLE 8

TERMINAL AUTHENTICATION MANAGEMENT TABLE

| TERMINAL ID | PASSWORD |
|---|---|
| 01aa | aaaa |
| 01ab | abab |
| 01ac | acac |
| . | . |
| . | . |
| . | . |

Furthermore, a terminal authentication management DB 5002 including a terminal authentication management table is constructed in the storage unit 5000. In the terminal authentication management table, passwords are managed in association with the communication IDs of all of the transmitting terminals 10 managed by the transmission management system 50.

TABLE 9

TERMINAL MANAGEMENT TABLE

| COMMUNICATION ID | NAME | OPERATING STATE | RECEPTION TIME AND DATE | IP ADDRESS |
|---|---|---|---|---|
| 01aa | AA CONFERENCE TERMINAL | ONLINE | 2013.11.10.13:40 | 1.2.1.3 |
| 01ab | AB CONFERENCE TERMINAL | ONLINE | 2013.11.09.12:00 | 1.2.1.4 |
| 01ac | AC CONFERENCE TERMINAL | ONLINE | 2013.11.11.13:00 | 1.2.1.5 |
| 01ad | AD CONFERENCE TERMINAL | ONLINE | 2013.11.10.13:45 | 1.2.2.3 |
| 01bb | BB CONFERENCE TERMINAL | OFFLINE | 2013.11.10.13:50 | 1.2.2.4 |

Furthermore, a terminal management DB 5003 including a terminal management table is constructed in the storage unit 5000. In the terminal management table, a name (destination name) used when the transmitting terminal 10 is a destination, the operating state of each transmitting terminal 10, the reception time and date when login request information described below is received at the transmission management system 50, and the IP address of the transmitting terminal 10 are managed in association with the communication ID of each transmitting terminal 10.

TABLE 10

DESTINATION LIST MANAGEMENT TABLE

| COMMUNICATION ID | DESTINATION LIST |
|---|---|
| 01aa | 01ab, 01ac, 01ad, 01bb |
| 01ab | 01aa, 01ac, 01ad, 01bb |
| 01ac | 01aa, 01ab, 01ad, 01bb |
| 01ad | 01aa, 01ab, 01ac, 01bb |
| 01bb | 01aa, 01ab, 01ac, 01ad |
| . | . |
| . | . |
| . | . |

Furthermore, a destination list management DB 5004 including a destination list management table is constructed in the storage unit 5000. In the destination list management table, all of the communication IDs of the destination terminals registered as candidate destination terminals are managed in association with the communication ID of the request source terminal requesting to start a call in a TV conference. For example, in the destination list management table as indicated in Table 10, when a request source terminal (transmitting terminal 10*aa*) having a communication ID "01aa" makes a request to start a call in a TV conference, the candidate destination terminals for this request source terminal are the transmitting terminal 10*ab* having a communication ID of "01ab", the transmitting terminal 10*ac* having a communication ID of "01ac", the transmitting terminal 10*ad* having a communication ID of "01ad", and the transmitting terminal 10*bb* having a communication ID of "01bb".

TABLE 11

SESSION MANAGEMENT TABLE

| SESSION ID | RELAY DEVICE ID | REQUEST SOURCE TERMINAL ID | DESTINATION TERMINAL ID | CONFERENCE ID |
|---|---|---|---|---|
| se1 | 111a | 01aa | 01ac | C01 |
| se2 | 111b | 01aa | 01ab | C01 |
| se3 | 111d | 01aa | 01ad | C01 |
| . | . | . | . | . |
| . | . | . | . | . |
| . | . | . | . | . |

Furthermore, a session management DB 5005 including a session management table is constructed in the storage unit 5000. In the session management table, a relay device ID of the relay device 30 used for relaying image data and voice sound data, a communication ID of a request source terminal, a communication ID of a destination terminal, and a conference ID are managed in association with each session ID used for executing a session of selecting the relay device 30. The session ID is an ID for identifying a session, and the transmitting terminals 10 participating in the same conference may not necessarily be included in the same session.

On the other hand, the same conference ID is applied to the transmitting terminals 10 participating in the same conference.

(Functional Configuration of Transmission Management System)

Next, a detailed description is given of the functional configuration of the transmission management system 50. The transmitting/receiving unit 51 is realized by instructions from the CPU 301 and the network I/F 309 illustrated in FIG. 7. The transmitting/receiving unit 51 sends and receives various kinds of data with the transmitting terminal 10 or the relay device 30 via the communication network 2.

The terminal authenticating unit 52 is realized by instructions from the CPU 301 illustrated in FIG. 7. The terminal authenticating unit 52 authenticates the transmitting terminal 10 by using, as search keys, the communication ID and the password included in the login request information received via the transmitting/receiving unit 51. That is, the terminal authenticating unit 52 searches the terminal authentication management DB 5002, and authenticates a terminal by determining whether the same communication ID and password are managed in the terminal authentication management DB 5002. Note that the authentication method is not so limited, and client certificate (an authentication method using a public key and a secret key) may be used.

The state managing unit 53 is realized by instructions from the CPU 301 illustrated in FIG. 7. The state managing unit 53 manages the operating state of a request source terminal that has made a login request. The state managing unit 53 manages the operating state by storing the communication ID of the request source terminal, the operating state of the request source terminal, the reception time and date at which the login request information is received at the transmission management system 50, and the IP address of the request source terminal in association with each other in the terminal management DB 5003.

Furthermore, when the user switches the power switch 109 of the transmitting terminal 10 to a power-off state from a power-on state, state information indicating to turn off the power is sent from the transmitting terminal 10 to the transmission management system 50. Based on the received state information, the state managing unit 53 changes the operating state in the terminal management DB 5003 from online to offline.

The terminal extracting unit 56 is realized by instructions from the CPU 301 illustrated in FIG. 7. The terminal extracting unit 56 uses the communication ID of the request source terminal that has made a login request as a search key, to search the destination list management DB 5004, and extract a communication ID that is a candidate destination terminal that can make a call with the request source terminal. Furthermore, the terminal extracting unit 56 uses the communication ID of the request source terminal that has made a login request as a search key, to search the destination list management DB 5004, and extract a communication ID of another request source terminal in which the communication ID of the request source terminal is registered as a candidate destination terminal.

The terminal state acquiring unit 54 is realized by instructions from the CPU 301 illustrated in FIG. 7. The terminal state acquiring unit 54 uses, as a search key, the communication ID of the candidate destination terminal extracted by the terminal extracting unit 56, to search the terminal management DB 5003 and acquire the operating state of each communication ID extracted by the terminal extracting unit 56. Accordingly, the terminal state acquiring unit 54 is able to acquire the operating state of the candidate destination terminal that can make a call with the request source terminal that has made the login request.

The session managing unit 55 is realized by instructions from the CPU 301 illustrated in FIG. 7. The session managing unit 55 stores and manages a session ID, a communication ID of the request source terminal, a communication ID of the destination terminal, and a conference ID in association with each other in the session management DB 5005.

The storage/read processing unit 59 is realized by instructions from the CPU 301 and the HDD 305 illustrated in FIG. 7. The storage/read processing unit 59 stores various kinds of data in the storage unit 5000 and reads various kinds of data stored in the storage unit 5000.

<<Functional Configuration of Relay Device>>

The relay device 30 includes a transmitting/receiving unit 31, a state detecting unit 32, and a storage/read processing unit 39. These units are functions that are realized or means that are provided as any of the elements illustrated in FIG. 7 operates in response to an instruction from the CPU 301 according to a relay device-use program 3010 loaded in the RAM 303 from the HD 304.

Furthermore, the relay device 30 includes a storage unit 3000. The storage unit 3000 is constructed by the HD 304 illustrated in FIG. 7. The storage unit 3000 stores a relay management DB 3001 and the relay device-use program 3010.

TABLE 12

RELAY MANAGEMENT TABLE

| CONFERENCE ID | COMMUNICATION ID | IP ADDRESS | DATA ID |
|---|---|---|---|
| C01 | 01aa | 1.2.1.3 | Ap, Av, Ad |
|  | 01ab | 1.2.1.4 | Bp, Bv, Bd |
|  | 01ac | 1.2.1.5 | Cp, Cv, Cd |
|  | 01ad | 1.2.2.3 | Dp, Dv, Dd |

The relay management DB 3001 including a relay management table as indicated in Table 12 is constructed in the storage unit 3000. In the relay management table, the communication ID, the IP address, and the data ID of the transmitting terminal 10 participating in a conference are registered in association with a conference ID of the conference.

The transmitting/receiving unit 31 of the relay device 30 is realized by instructions from the CPU 301 and the network I/F 309 illustrated in FIG. 7. The transmitting/receiving unit 31 sends and receives various kinds of data with the transmitting terminal 10 or the transmission management system 50 via the communication network 2.

The state detecting unit 32 is realized by instructions from the CPU 301 illustrated in FIG. 7. The state detecting unit 32 detects the operating state of the relay device 30 in which the state detecting unit 32 is included. As the operating state, there are states including "online", "offline", "during call", and "temporarily interrupted", etc.

The storage/read processing unit 39 is realized by instructions from the CPU 301 and the HDD 305 illustrated in FIG. 7. The storage/read processing unit 39 stores various kinds of data in the storage unit 3000 and reads various kinds of data stored in the storage unit 3000.

<From Start of Communication to Establishment of Session>

Figure 9:
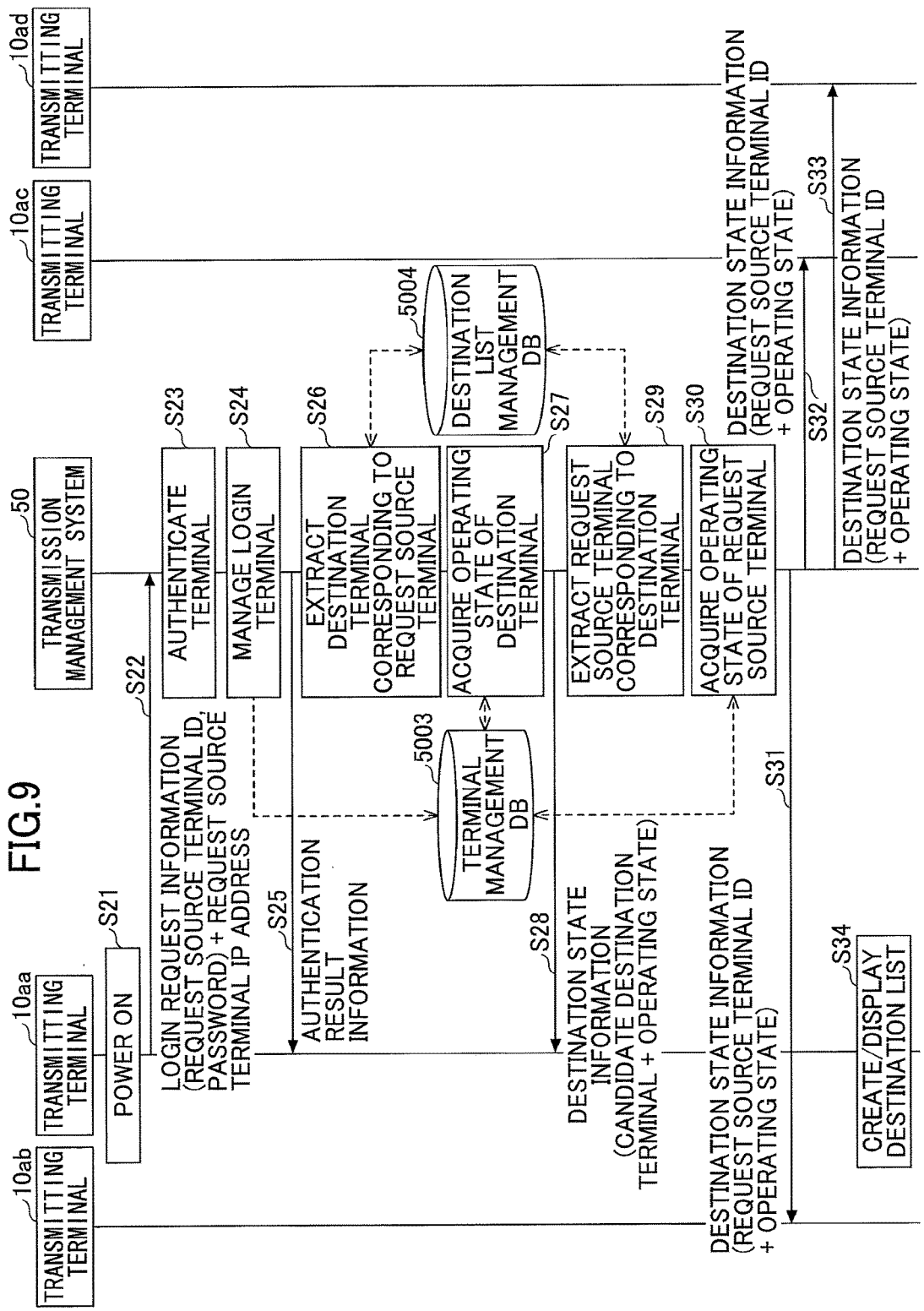
FIG. 9 is a sequence diagram of an example of a process of a preparation stage for starting communication between a plurality of transmitting terminals according to an embodiment of the present invention.

FIG. 9 is a sequence diagram of an example of a process of a preparation stage for starting communication between a plurality of transmitting terminals 10. Referring to FIG. 9, a description is given of a preparation process for the transmitting terminal 10*aa* to start communication with the transmitting terminals 10*ac*, 10*ab*, and 10*ad*.

First, when the user switches the power switch 109 to a power-on state, the operation input accepting unit 21 of the transmitting terminal 10*aa* accepts the instruction for power-on and turns on the power (step S21). Then, the login requesting unit 12 of the transmitting terminal 10*aa* is triggered by the reception of power-on, to automatically send login request information indicating a login request from the transmitting/receiving unit 11 to the transmission management system 50 via the communication network 2 (step S22). The login request may be sent at any timing according to a user's operation, other than the timing when the power is turned on. This login request information includes a communication ID for identifying the transmitting terminal 10*aa* that is the request source and a password. Note that when the login request information is sent from the transmitting terminal 10*aa* to the transmission management system 50, the transmission management system 50 that is the receiving side is able to recognize the "IP address" of the transmitting terminal 10*aa*. Note that when the mobile terminal 20 is the request source terminal, the operation input accepting unit 21 accepts a login operation by the user, and sends the communication ID and the password to the transmission management system 50.

Next, the terminal authenticating unit 52 of the transmission management system 50 determines whether the same communication ID and password as the communication ID and password, which are included in the login request information received via the transmitting/receiving unit 51, are managed, and performs terminal authentication based on the determination result (step S23). In the present embodiment, the description is given assuming that the authentication is successful.

When the transmitting terminal 10 is successfully authenticated by the terminal authenticating unit 52, the state managing unit 53 stores the communication ID, the "operating state", and the "communication state" of the transmitting terminal 10*aa*; the "reception time" when the above login request information is received; and the "IP address" of the transmitting terminal 10*aa* in association with each other, in the terminal management table (step S24). Note that the "operating state" at this time is "online".

The transmitting/receiving unit 51 of the transmission management system 50 sends the authentication result information indicating the authentication result obtained by the terminal authenticating unit 52, to the transmitting terminal 10*aa* that has requested to log in via the communication network 2 (step S25).

The terminal extracting unit 56 of the transmission management system 50 uses "01aa", which is the communication ID of the transmitting terminal 10*aa* that has made the login request, as a search key to search the destination list management table, and reads and extracts the communication IDs of the transmitting terminal candidates that can communicate with the transmitting terminal 10*aa* (step S26). Here, the terminal extracting unit 56 extracts "01ab", "01ac", "01ad", and "01bb", which are the communication IDs of the destination terminals (10*ab*, 10*ac*, 10*ad*, and 10*bb*) corresponding to "01aa" that is the communication ID of the transmitting terminal 10*aa*.

Next, the terminal state acquiring unit 54 uses the communication IDs ("01ab", "01ac", "01ad", and "01bb") of the transmitting terminals 10*ab*, 10*ac*, 10*ad*, and 10*bb* extracted by the terminal extracting unit 56 as search keys to search the terminal management table, and reads the "operation state" for each communication ID (step S27). Here, it is assumed that the transmitting terminals 10ab, 10ac, and 10ad are "online" and the transmitting terminal 10bb is "offline".

Next, the transmitting/receiving unit 51 sends destination state information including the communication IDs ("01ab", "01ac", "01ad", and "01bb") extracted by the terminal extracting unit 56 and the "operating states" to the transmitting terminal 10aa via the communication network 2 (step S28). Accordingly, the transmitting terminal 10aa is able to recognize the "operation states" at the present time point of the transmitting terminals (10ab, 10ac, 10ad, and 10bb) that can communicate with the transmitting terminal 10aa.

Furthermore, the terminal extracting unit 56 of the transmission management system 50 uses "01aa", which is the communication ID of the transmitting terminal 10aa that has made the login request, as a search key to search the destination list management table, and extracts the communication ID of the transmitting terminal 10 in which the communication ID "01aa" is registered as a candidate destination terminal (step S29). In the above destination list management table, the communication IDs of the other extracted transmitting terminals 10 are "01ab", "01ac", "01ad", and "01bb".

Next, the terminal state acquiring unit 54 of the transmission management system 50 uses "01aa", which is the communication ID of the transmitting terminal 10aa that has made the login request, as a search key to search the terminal management table, and acquire the "operating state" of the transmitting terminal 10aa (step S30).

Then, the transmitting/receiving unit 51 sends destination state information including "01aa" that is the communication ID of the transmitting terminal 10aa acquired in step S30 and the "operating state" indicating "online", to the transmitting terminal 10 having an "operating state" indicating "online" in the terminal management table among the transmitting terminals 10 having the communication IDs ("01ab", "01ac", "01ad", and "01bb") extracted in step S29 (steps S31, S32, and S33). Therefore, the destination state information is sent to the transmitting terminals 10ab, 10ac, and 10ad. Note that when the transmitting/receiving unit 51 sends the destination state information to the transmitting terminals 10ab, 10ac, and 10ad, the transmitting/receiving unit 51 refers to the "IP addresses" of the transmitting terminals 10 managed in the terminal management table, based on the communication IDs ("01ab", "01ac", and "01ad").

When the destination list creating unit 24 of the transmitting terminal 10aa receives the information of the destination list and the "operating states" of the candidate destination terminals, the destination list creating unit 24 creates a destination list screen, and displays the destination list screen on the display 120 (step S34). In this case, in the destination list screen, the names of the transmitting terminals 10ab, 10ac, and 10ad and "online" expressing the "operating state" are displayed. Also, in the destination list screen, the name of the transmitting terminal 10bb and "offline" expressing the "operating state" are displayed.

On the other hand, at the other transmitting terminals 10ab, 10ac, and 10ad, the same process as the process of FIG. 9 is performed, and the destination list screen is displayed on the display 120 of the transmitting terminal 10 having the transmitting terminals 10ab, 10ac, and 10ad as the candidate destinations.

FIG. 10 is a sequence diagram of an example of a process of establishing a session among a plurality of transmitting terminals 10.

When the user selects, for example, a destination terminal having a communication ID of "01ac" among the communication IDs displayed on the destination list screen by operating the operation buttons 108 of the transmitting terminal 10aa, the operation input accepting unit 21 accepts a request for starting connection (step S41).

The transmitting/receiving unit 11 of the transmitting terminal 10aa sends start request information indicating a request to start connection to the transmission management system 50 (step S42). The start request information includes the communication ID "01aa" of the transmitting terminal 10aa and "01ac" that is the "communication ID of the destination terminal". Accordingly, the transmission management system 50 recognizes the "IP address" of the request source terminal (transmitting terminal 10aa).

Next, the session managing unit 55 of the transmission management system 50 generates a "session ID" (step S43). An ID that does not overlap other IDs is generated as the "session ID".

Then, the transmission management system 50 manages and stores the generated "session ID", the communication ID "01aa" of the request source terminal (transmitting terminal 10aa), and the communication ID "01ac" of the destination terminal (transmitting terminal 10ac) in association with the each other in the session management DB 5005 (step S44). Furthermore, the transmission management system 50 applies a conference ID.

Furthermore, the session managing unit 55 of the transmission management system 50 determines an appropriate relay device 30 for performing communication between the request source terminal and the destination terminal (step S45). The method of determining the relay device 30 may be, for example, a method of selecting the relay device 30 in a network having the widest band for reception and transmission.

Note that a session may be directly established between the request source terminal and the destination terminal without selecting the relay device 30, or a session may be established via the transmission management system 50, without selecting the relay device 30.

Then, the transmitting/receiving unit 51 of the transmission management system 50 sends the "session ID" generated in step S43 and the "IP address" of the relay device 30 determined in step S45 to the request source terminal (transmitting terminal 10aa) and the destination terminal (transmitting terminal 10ac) (steps S46 and S47).

The display control unit 23 of the transmitting terminal 10ac displays the communication ID of the request source terminal (transmitting terminal 10aa) on the display 120, and the operation input accepting unit 21 accepts the user's permission for a TV conference. Then, the transmitting/receiving unit 11 of the transmitting terminal 10ac sends the start permission to the transmission management system 50 (step S47-1).

Next, the state managing unit 53 of the transmission management system 50 sends the "IP address" and the communication ID of the request source terminal (transmitting terminal 10aa), the "IP address" and the communication ID of the destination terminal (transmitting terminal 10ac), and the conference ID, as relay start request information, to the relay device 30 (step S48). The relay device 30 manages the communication IDs in association with the conference ID in the relay management table. Furthermore, the relay device 30 applies a data ID that does not overlap any of the communication IDs. The data ID may or may not be reported to each of the transmitting terminals 10. When the data ID is reported, the transmitting terminal 10 applies the data ID to content data and sends the content data to the relay device 30. When the data ID is not reported, the relay device 30 identifies the transmitting terminal 10 based on the IP address, etc., applies a data ID to the content data, and sends the content data to the transmitting terminal 10.

When the transmitting/receiving unit 31 of the relay device 30 receives the communication IDs from the transmission management system 50, the transmitting/receiving unit 31 detects that the transmitting terminal 10*aa* and the transmitting terminal 10*ac* are the transmission destinations of the content data based on the communication IDs. Accordingly, a session is established between the request source terminal (transmitting terminal 10*aa*) and the destination terminal (transmitting terminal 10*ac*) (step S49). When the session is established, the transmitting terminal 10*aa* sends content data to the transmitting terminal 10*ac* via the relay device 30, and the transmitting terminal 10*ac* sends content data to the transmitting terminal 10*aa* via the relay device 30.

Next, the user of the transmitting terminal 10*aa* sends an invitation report to the transmission management system 50 (step S50). An invitation report is a report for inviting another transmitting terminal 10 to participate in the TV conference in which a session is already established. The invention report includes the communication ID "01aa" of the transmitting terminal 10*aa* that has sent the invitation report and the communication IDs "01ab" and "01ad" of the transmitting terminals 10*ab* and 10*ad* that are invited. Furthermore, the transmission management system 50 acquires the "IP address" of the transmitting terminal 10*aa* that has sent the invitation report.

When the transmitting/receiving unit 51 of the transmission management system 50 receives the invitation report, the terminal state acquiring unit 54 of the transmission management system 50 acquires the "IP addresses" of the invited transmitting terminals 10*ab* and 10*ad* from the terminal management table. Accordingly, the transmitting/receiving unit 51 of the transmission management system 50 sends the invitation report to the transmitting terminals 10*ab* and 10*ad* (step S51).

The display control unit 23 of the transmitting terminals 10*ab* and 10*ad* displays the communication IDs of the request source terminal (transmitting terminal 10*aa*) on the display 120, and the operation input accepting unit 21 accepts a response by the user to the invitation to the TV conference. Here, it is assumed that the user has accepted the invitation. Then, the transmitting/receiving unit 11 of the transmitting terminals 10*ab* and 10*ad* sends the acceptance to the invitation to the transmission management system 50 (step S52).

The session managing unit 55 of the transmission management system 50 applies the same conference ID as the conference ID of the transmitting terminals 10*aa* and 10*ac*, to the transmitting terminals 10*ab* and 10*ad*.

The transmitting/receiving unit 51 of the transmission management system 50 sends the invitation acceptance to the transmitting terminal 10*aa* that has sent the invitation report (step S53).

Next, the transmitting/receiving unit 51 performs the processes of steps S47 and S48 with respect to the invited transmitting terminals 10*ab* and 10*ad*. Accordingly, the transmitting terminals 10*ab* and 10*ad* are able to participate in the session of the transmitting terminals 10*aa* and 10*ac*. That is, the relay device 30 sends (transfers) the content data among the transmitting terminals 10*aa*, 10*ac*, 10*ab*, and 10*ad* of the same conference ID.

Subsequently, content data is sent and received among the request source terminal (transmitting terminal 10*aa*), the destination terminal (transmitting terminal 10*ac*), and the invited transmitting terminals 10*ab* and 10*ad*, via the relay device 30.

<Creation of Participant Information Table>

Next, referring to FIG. 11, a description is given of the creation the participant information table. FIG. 11 is a flowchart of an example of procedures of creating a participant information table. The procedures of FIG. 11 are repeatedly executed while the content data is being sent and received. The repeated cycle corresponds to the cycle of updating the layout of the conference screen 500. This cycle is determined based on the period of monitoring whether the reception band is stable. The cycle may be a fixed value such as several tens of milliseconds through several tens of seconds. Alternatively, the tendency of the variation of the reception band may be digitized to determine the repetition cycle of the procedures of FIG. 11. For example, the cycle length may be decreased when the reception band varies frequently, and the cycle length may be increased when the reception band varies less frequently.

When the timing to determine the layout of the conference screen 500 approaches, the participant information acquiring unit 19 stores the recent number of participating terminals (participating terminal number) as the recent participating terminal 1030 in the storage unit 1000 (step S10). This number is stored for the purpose of recognizing whether there is any increase or decrease in the number of participating terminals (participating terminal number).

Furthermore, the participant information acquiring unit 19 stores the recent participant information as the recent participant information 1020 in the storage unit 1000 (step S20). This information is stored for the purpose of recognizing whether there are any changes in the image data or display data being received.

Next, the participant information acquiring unit 19 acquires the communication IDs of the participating terminals from the transmission management system 50 (step S30). The communication IDs of the participating terminals are registered in the session management table.

Next, the participant information acquiring unit 19 acquires the communication IDs and the data IDs of the transmitting terminals 10 associated with the same conference ID, from the relay device 30 (step S40). The relay device 30 sends the communication IDs and the data IDs of even the transmitting terminals 10 to which the content data is not sent.

Furthermore, the transmitting terminal 10*aa* receives the data ID together with the content data from the transmitting terminal 10 sending the content data via the relay device 30 (step S50). Note that the transmitting terminal 10*aa* implements media control for determining the content data to be received. The media control is briefly described.

a) Determine the display location number based on the reception band.
b) Determine the participating terminal number based on the result of step S30.
c) Determine the lower value between the display location number and the participating terminal number, as the final display location number.
d) Determine the reception location number to be the same as the display location number.

e) Identify the transmitting terminals 10 corresponding to the reception location number from the top ranking transmitting terminals 10 in the priority rank order table.

The transmitting terminal 10aa requests the relay device 30 to send the content data of the transmitting terminal 10 determined as described above.

Note that when the content data is already being received (when a participant information table is already created), the transmitting terminal 10 implements control as described below.

(i) No action is performed with respect to the transmitting terminal 10 that is already receiving content data, among the transmitting terminals 10 determined by the participant information table.

(ii) Request the relay device 30 to send the content data with respect to the transmitting terminal 10 that has not yet received content data, among the transmitting terminals 10 determined by the participant information table.

(iii) Request the relay device 30 to stop sending the content data with respect to the transmitting terminal 10 that is already receiving content data but is not determined by the participant information table.

The participant information acquiring unit 19 determines whether the content data will actually be sent from the relay device 30 with respect to each data ID (that is, with respect to each of the image data, the voice sound data, and the display data) of the transmitting terminal 10, and the participant information acquiring unit 19 registers whether an image, voice sound, and display data is received with respect to each communication ID (step S60). Accordingly, the participant information table is obtained.

<Substitute Image>

As described by referring to FIG. 1, when the image data displayed in the area 503 is not received anymore, the transmitting terminal 10 displays a substitute image in the area 503.

Figure 12A:
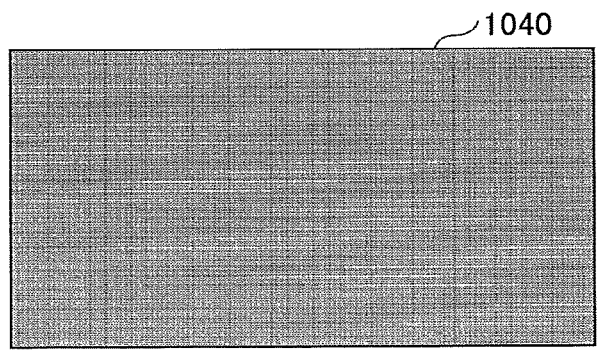
FIGS. 12A through 12D are diagrams illustrating substitute images according to an embodiment of the present invention.

FIG. 12A is a diagram illustrating the substitute image displayed in FIG. 1. The substitute image of FIG. 1 is a rectangular image having a uniform color. However, a substitute image is for maintaining the present layout, and thus does not need to have a uniform color. Any kind of image can be used as the substitute image. For example, the image may have a gradation or the image may have a geometric pattern such as a checkered pattern or a lattice pattern. The substitute image in FIG. 12A is stored as the substitute image 1040 in the storage unit 1000.

Figure 12B:
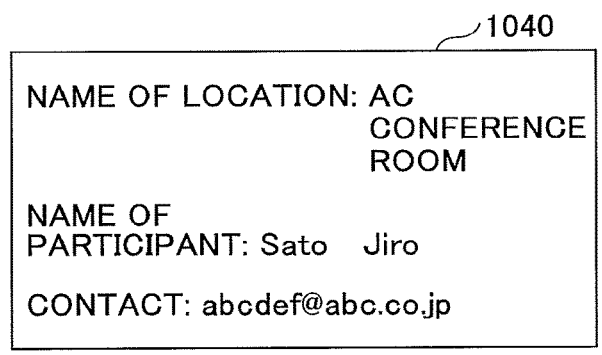

FIG. 12B is a diagram illustrating another example of a substitute image. As the substitute image, information indicating the location and the participating terminal may be displayed. The name of the location in FIG. 12B is registered in the terminal management table in the transmission management system 50. When the user that is the communication counterpart is using the mobile terminal 20, profile information stored in the mobile terminal 20 is used as the participant name and contact. The profile information is registered in an application (APP) operating in the mobile terminal 20 by the user. Furthermore, when the user that is the communication counterpart is using the transmitting terminal 10, the authentication accepting I/F 119 of the transmitting terminal 10 reads the profile information from an integrated circuit (IC) card or the mobile terminal 20 held by the user. The display control unit 23 creates a substitute image based on the acquired information. When the substitute image of FIG. 12B is displayed, the user of the transmitting terminal 10 displaying the substitute image is able to recognize the location of the image data or the display data that is not displayed anymore.

Figure 12C:
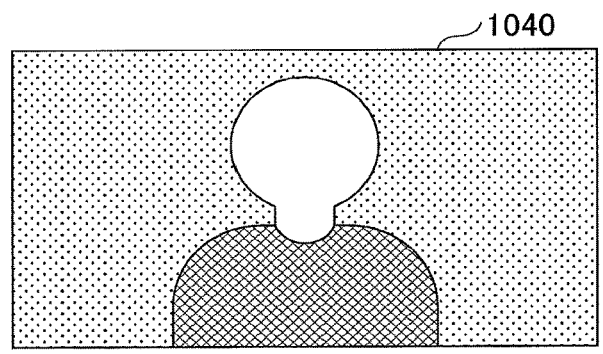

FIG. 12C is a diagram illustrating yet another example of a substitute image. As the substitute image, image data may be displayed. The image data is one frame of the image data that has been received until the transmitting terminal 10 stops receiving the image data. Preferably, the frame received last, or the frame received immediately before the transmitting terminal 10 stops receiving image data, is used as the substitute image. This kind of substitute image is a still image. In this case, the user viewing the substitute image is unlikely to notice that the transmitting terminal 10 has stopped receiving image data, and therefore the user is unlikely to feel a sense of discomfort.

Note that the image data received by the transmitting terminal 10 is sequentially stored in and overwritten in the storage unit 1000. Therefore, by reading the image data from the storage unit 1000, the display control unit 23 is able to create a substitute image by using the image data received last.

Figure 12D:
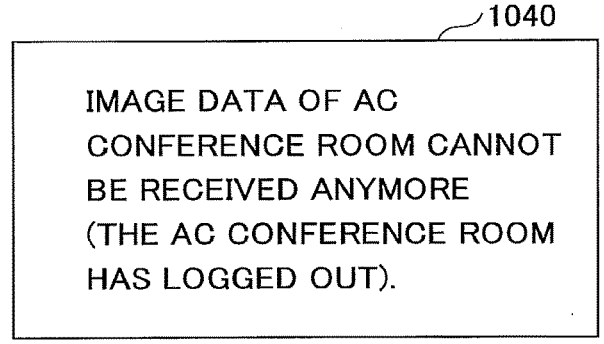

FIG. 12D is a diagram illustrating yet another example of a substitute image. As the substitute image, the reason why the image data is not displayed, may be displayed. In FIG. 12D, a message saying "image data of AC conference room cannot be received anymore" is displayed. Furthermore, there may be cases where a message saying "AC conference room has logged out". The participating terminals are registered in the participant information table and the recent participating terminals are registered in the recent participating terminal 1030. Therefore, by comparing the recent participating terminal 1030 with the participant information table, it can be recognized that the reason why the image data is not displayed anymore is that the corresponding transmitting terminal 10 has logged out. Furthermore, when a terminal is registered as a participating terminal in the participant information table but image reception is "none", it can be recognized that image data is not received anymore. The display control unit 23 refers to the participant information table and creates a substitute image describing the reason why image data is not displayed. When the substitute image of FIG. 12D is displayed, the user is able to recognize the reason why the image data is not displayed.

Note that two or more of the images in FIGS. 12A through 12D may be combined to create the substitute image. Furthermore, a video showing a method of using the transmitting terminal 10 or a video showing an advertisement may be displayed.

<Determination of Layout>

Figure 13:
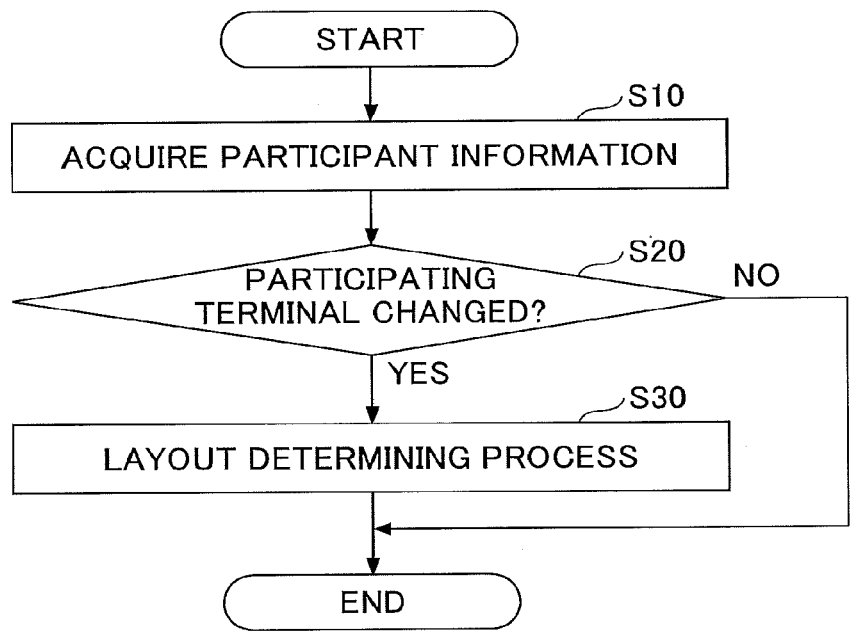
FIG. 13 is a flowchart of an example of procedures by the transmitting terminal for determining whether to change the layout based on changes in the participating terminals according to an embodiment of the present invention.
Figure 14:
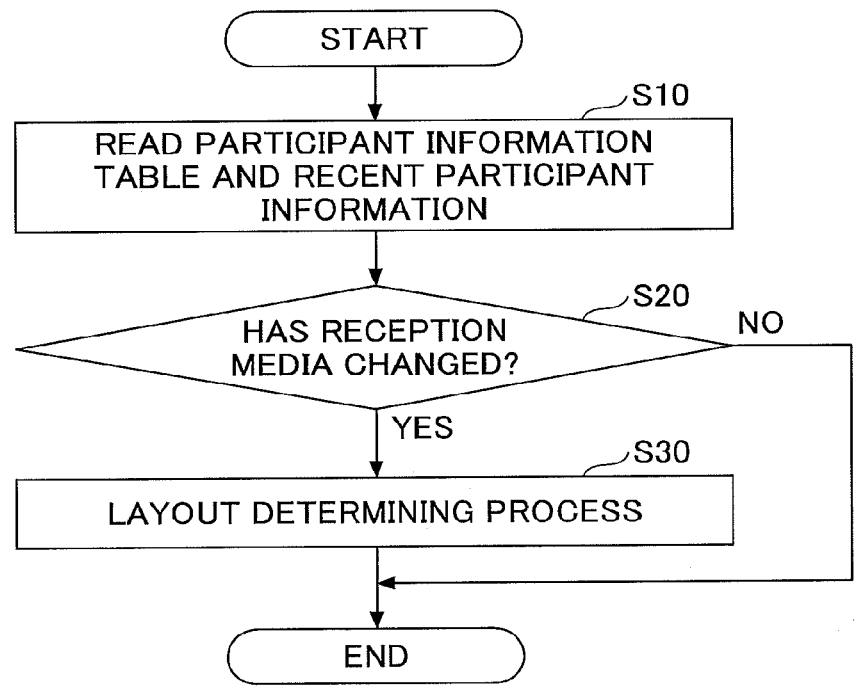
FIG. 14 is a flowchart of an example of procedures by the transmitting terminal for determining whether to change the layout based on variations in the reception of images and the reception of display data according to an embodiment of the present invention.

Referring to FIGS. 13 and 14, a description is given of the factor triggering the transmitting terminal 10aa, which is sending and receiving content data, to change the layout. FIG. 13 is a flowchart of an example of procedures by the transmitting terminal 10aa for determining whether to change the layout based on changes in the participating terminals. The procedures of FIG. 13 are repeatedly executed.

The layout determining unit 23a acquires participant information from the participant information table (step S10).

Next, the layout determining unit 23a refers to the recent participant information 1020 to determine whether the participating terminals have changed (step S20). The determination of whether the participating terminals have changed is done mainly by determining whether the participating terminal number (number of locations) has changed. However, the layout determining unit 23a may detect a case where the participating terminals have changed while maintaining the participating terminal number (that is, the locations have been replaced while the number of locations is maintained).

When the determination of step S20 is YES, the layout determining unit 23a performs a layout determination process, because the layout may change due to the change in the participating terminals (step S30). The layout determination process is described below referring to FIG. 15.

FIG. 14 is a flowchart of an example of procedures by the transmitting terminal 10aa for determining whether to change the layout based on variations in the reception of images and the reception of display data. The procedures of FIG. 14 are repeatedly executed.

The layout determining unit 23a reads the participant information table and the recent participant information 1020 (step S10).

Next, the layout determining unit 23a determines whether there is any change in the reception media (step S20). The reception media corresponds to image data or display data. When there a change in at least one of image reception or display data reception, the determination of step S20 is YES. Note that whether there is voice sound reception does not affect the layout much, and therefore whether there is any change in voice sound reception may or may not be determined.

When the determination of step S20 is YES, the layout determining unit 23a performs a layout determination process, because the layout may change due to the change in whether there is image reception or display data reception (step S30). The layout determination process is described below referring to FIG. 15.

Figure 15:
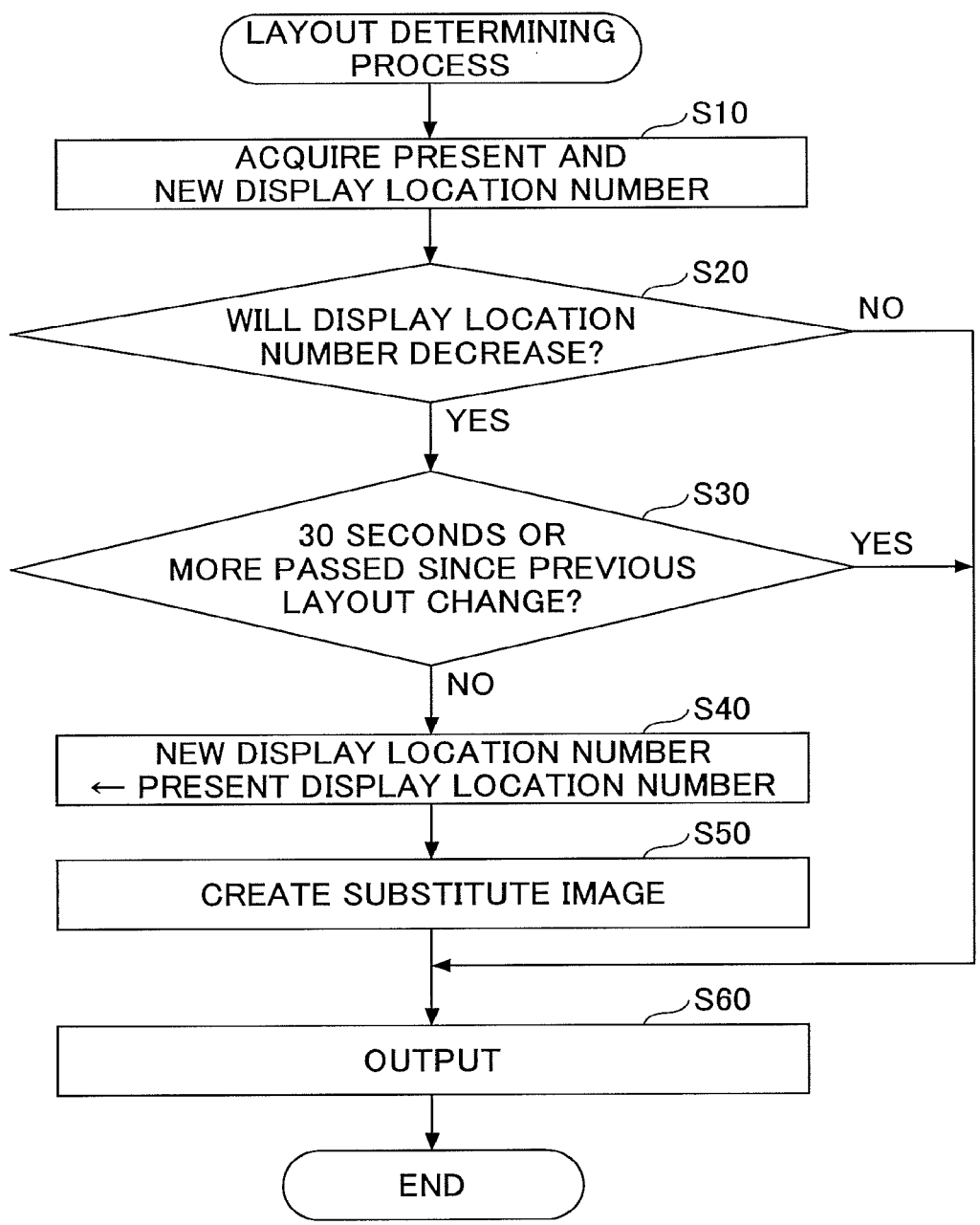
FIG. 15 is a flowchart of an example of details of a layout determination process according to an embodiment of the present invention.

FIG. 15 is a flowchart of an example of details of the layout determination process. The process of FIG. 15 is started when it is determined to perform layout determination in the procedures of FIG. 13 or FIG. 14.

First, the layout determining unit 23a acquires the present display location number and the new display location number (step S10). The present display location number is the number of locations presently displayed on the conference screen 500. The new display location number is "c) the lower value between the display location number determined based on the reception band and the participating terminal number" described by referring to FIG. 13.

The layout determining unit 23a determines whether the display location number will decrease (step S20). When the determination in step S20 is NO, the process proceeds to step S60, and the display control unit 23 outputs the conference screen 500. Details of step S60 are described referring to FIG. 17.

When the determination in step S20 is YES, the time determining unit 23b of the transmitting terminal 10 determines whether 30 seconds or more have passed since the previous layout change (step S30).

When the determination in step S30 is NO, the time determining unit 23b replaces the display location number determined by the display location number determining unit 25 with the present display location number (step S40). That is, because 30 seconds have not passed since the previous layout change, the present display location number is maintained. Accordingly, frequent screen transitions can be reduced.

Next, the layout determining unit 23a creates a substitute image (step S50). That is, image reception (or display data reception) will stop, and therefore a substitute image to display in the area of the missing image is created.

The display control unit 23 creates the conference screen 500 including or not including a substitute image, and outputs the conference screen 500 to the display 120 (step S60).

When the determination in step S30 is YES, 30 seconds have passed since the layout change, and therefore the process proceeds to step S60. Therefore, the conference screen 500, which includes the display location number determined by the display location number determining unit 25 and which does not include a substitute image, is created (step S60).

By the above process, when the display location number decreases, an interval of at least 30 seconds is required until the next time the layout is changed after the last layout change, and therefore frequent screen transitions can be reduced.

Note that an interval of 30 seconds is obtained by experimentally confirming that the trouble inflicted on the user is significantly reduced by changing the layout at intervals of approximately 30 seconds. However, 30 seconds is one example; for example, the interval may be less than 30 seconds or more than 30 seconds.

Furthermore, when the display location number increases, a 30 second interval may be set between the last layout change and the next layout change.

FIG. 16 is a flowchart illustrating a modified example of FIG. 15. In FIG. 16, in step S20, the layout determining unit 23a determines whether the display location number is constant (step S20). When the determination in step S20 is NO, step S30 is processed, and therefore a 30 minute interval can be provided between the last layout change and the next layout change.

Furthermore, the interval between the last layout change and the next layout change may be differed according to whether the display location number decreases or increases.

<Output of Conference Screen>

FIG. 17 is a flowchart of an example of procedures of creating the conference screen 500 by the display control unit 23. The procedures of FIG. 17 are executed, for example, in step S60 of FIGS. 15 and 16.

First, the layout determining unit 23a identifies the transmitting terminals 10 corresponding to the display location number determined in step S10 or step S40 of FIG. 15 from top ranking transmitting terminals 10 in the priority rank order table (step S10). Accordingly, the speaker's image data can be easily displayed.

Next, the layout determining unit 23a refers to the layout management table and determines the layout, based on the display location number determined in step S10 or step S40 of FIG. 15 (step S20).

The display control unit 23 arranges the image data or the display data in the areas of the conference screen 500 for which the layout has been determined (step S30).

Next, the layout determining unit 23a determines whether there is any transmitting terminal 10 for which image data is not displayed anymore (step S40). This determination of step S40 is done as described by referring to FIG. 13.

When the determination in step S40 is YES, the layout determining unit 23a identifies, from the area management table, the area where the image data of the determined transmitting terminal 10 is not displayed any more (step S50).

The display control unit 23 arranges a substitute image in the area identified in step S50 (step S60).

As described above, the display control unit 23 can display the conference screen 500 in which a substitute image is arranged in the area where content data is not received anymore, due to the decrease in the reception band or the decrease in the participating terminals.

<<Transition Examples of Conference Screen>>

Figure 18A:
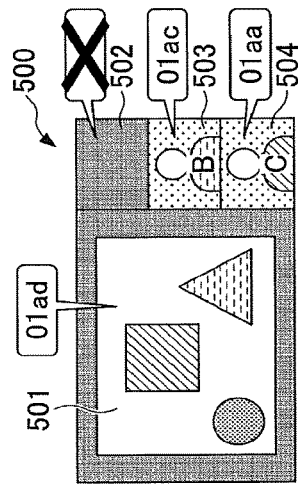
FIGS. 18A through 18F are diagrams illustrating examples of the conference screens displayed by the transmitting terminal according to an embodiment of the present invention.

FIG. 18A is a diagram illustrating an example of the conference screen 500 displayed by the transmitting terminal 10aa. The display data sent by the transmitting terminal 10ad is displayed in the area 501, the display data sent by the transmitting terminal 10ab is displayed in the area 502, the display data sent by the transmitting terminal 10ac is displayed in the area 503, and the display data of the transmitting terminal 10aa (the own device) is displayed in the area 504.

Figure 18C:
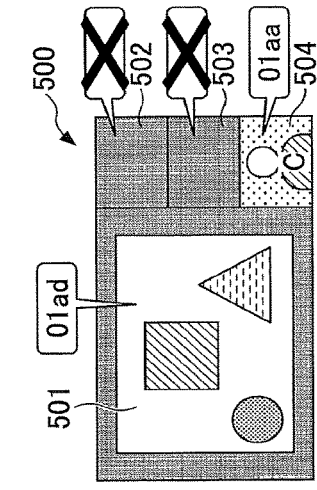
Figure 18B:
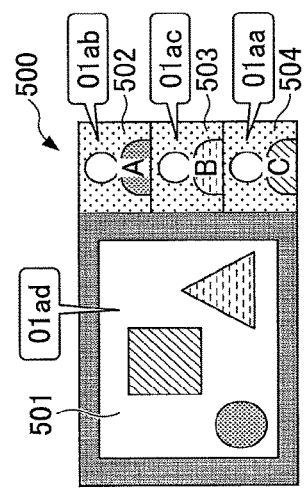

When the transmitting terminal 10aa does not receive the image data of the transmitting terminal 10ab anymore, as illustrated in FIG. 18B, the transmitting terminal 10aa displays a substitute image in the area 502.

Figure 18D:
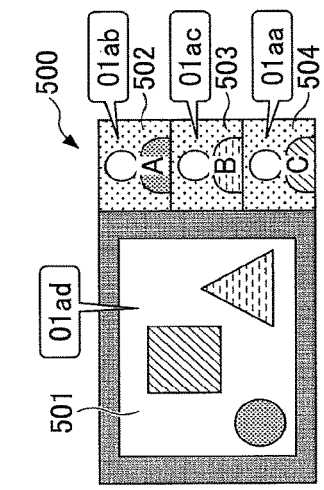

Furthermore, when the transmitting terminal 10aa does not receive the display data of the transmitting terminals 10ab and 10ac anymore due to the rapid deterioration of in the reception band from the state of FIG. 18C (same as FIG. 18A), as illustrated in FIG. 18D, the transmitting terminal 10aa displays a substitute image in the areas 502 and 503.

Figure 18E:
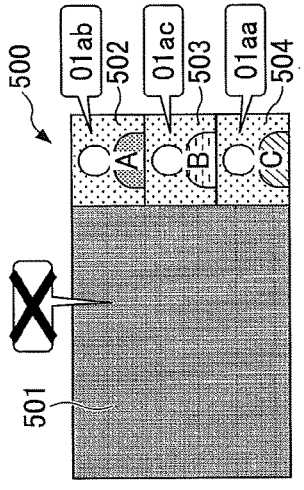
Figure 18F:
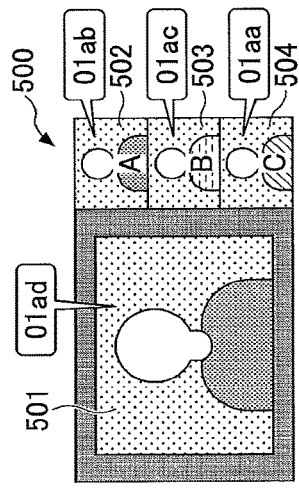

In FIGS. 18A through 18F, the display data is prioritized; however, the display data may be replaced with a substitute image without prioritizing the display data. Furthermore, when the display data is not displayed, the image data in the area 501 may be replaced by a substitute image. FIG. 18E illustrates a case where image data sent by the transmitting terminal 10ad is displayed in the area 501. When the image data sent by the transmitting terminal 10ad is not received anymore from the state of FIG. 18E, as illustrated in FIG. 18F, the transmitting terminal 10aa displays a substitute image in the area 501.

As described above, when the display location number decreases, the transmitting terminal 10 according to the present embodiment does not change the layout until a predetermined time passes from the last layout change. Accordingly, frequent screen transitions can be reduced, thus reducing the sense of discomfort felt by the user.

<Other Application Examples>

The information processing apparatus, the image display method, and the communication system are not limited to the specific embodiments described in the detailed description, and variations and modifications may be made without departing from the spirit and scope of the present invention.

For example, in the present embodiment, the transmitting terminal 10 performs communication via the relay device 30; however, the transmitting terminal 10 may perform communication without involving the relay device 30. As an example of a communication protocol of such a communication method, Web Real-Time Communication (WebRTC) is known. In this case also, the display location number can be determined according to the reception band.

Furthermore, in the configuration example of FIG. 8, etc., the configuration is divided according to the main functions for facilitating the understanding of processes by the transmission management system 50 and the transmitting terminal 10. However, the present invention is not limited by the way of dividing the configuration in units of processes or the names of the units. The processes of the transmission management system 50 and the transmitting terminal 10 may be further divided into more processing units according to processing contents. Furthermore, a single processing unit may be divided to include even more processes.

Furthermore, as a matter of convenience, in the present embodiment, the transmission management system 50 and the relay device 30 are described as separate devices; however, there may be a single device in which the functions of both the transmission management system 50 and the relay device 30 are integrated to provide the functions of the transmission management system 50 and the relay device 30.

Furthermore, the transmission system 100 may include a plurality of transmission management systems 50, and the functions of the transmission management system 50 may be distributed and disposed in a plurality of servers.

Furthermore, one or more of the databases included in the storage unit 5000 of the transmission management system 50 may be provided in a communication network. The same applies to the databases included in the storage unit 1000 of the transmitting terminal 10.

The display 120 is described as an example of a display device; however, any kind of display device may be used as long as images can be displayed, such as a projector, a Heads Up Display (HUD), a TV received, and a car navigation terminal.

According to one embodiment of the present invention, an information processing apparatus in which frequent screen transitions are reduced, can be provided.

What is claimed is:

1. An information processing apparatus comprising:
a receiver configured to receive one or more images from one or more other information processing apparatuses communicating with the information processing apparatus via a network;
a display number determiner configured to determine a number of the one or more images to be displayed on a display device based on a communication status;
a layout determiner configured to determine a layout of a screen on which the one or more images are displayed, according to the number of the one or more images determined by the display number determiner;
a time determiner configured to determine whether a predetermined time has passed from when the layout has been previously changed, when the display number determiner has determined to display a different number of the one or more images on the screen from the number of the one or more images that are displayed on the screen; and
a display processor configured to
display the screen having the layout, which has been previously changed, on the display device without changing the layout until the time determiner determines that the predetermined time has passed from when the layout has been previously changed, and to
display the screen having a different layout, which is different from the layout of the screen being displayed and which is newly determined by the layout determiner, on the display device when the time determiner determines that the predetermined time has passed from when the layout has been previously changed.

2. The information processing apparatus according to claim 1, wherein
when the display number determiner determines to display a smaller number of the one or more images on the screen than the number of the one or more images displayed on the screen,
the display processor displays the screen having the layout, which has been previously changed, on the display device without changing the layout until the time determiner determines that the predetermined time has passed from when the layout has been previously changed.

3. The information processing apparatus according to claim 2, wherein
when the display number determiner determines to display a smaller number of the one or more images on the screen than the number of the one or more images displayed on the screen,
the display processor replaces at least one of the one or more images displayed on the screen with a substitute image, and displays the screen having the layout, which has been previously changed, on the display device without changing the layout.

4. The information processing apparatus according to claim 3, wherein
when any of the one or more images displayed on the screen having the layout, which has been previously changed, is not received anymore by the receiver,
the display processor replaces the one or more images, which are not received anymore by the receiver, with the substitute image on the screen.

5. The information processing apparatus according to claim 3, wherein
the substitute image is an image having a uniform color.

6. The information processing apparatus according to claim 3, wherein
the receiver stores the one or more images in a storage, and
the display processor displays, as the substitute image, one of the one or more images, which are not received anymore by the receiver, among the one or more images stored in the storage.

7. The information processing apparatus according to claim 3, wherein
the display processor displays, as the substitute image, information of the one or more other information processing apparatuses that have been sending the one or more images that are not received anymore by the receiver, or
the display processor displays, as the substitute image, a reason why the one or more images are not received anymore by the receiver.

8. A method for displaying one or more images performed by an information processing apparatus, the method comprising:
receiving the one or more images from one or more other information processing apparatuses communicating with the information processing apparatus via a network;
determining a number of the one or more images to be displayed on a display device based on a communication status;
determining a layout of a screen on which the one or more images are displayed, according to the determined number of the one or more images;
determining whether a predetermined time has passed from when the layout has been previously changed, when the determined number of the one or more images to be displayed on the screen is different from the number of the one or more images that are displayed on the screen;
displaying the screen having the layout, which has been previously changed, on the display device without changing the layout until the predetermined time is determined to have passed from when the layout has been previously changed; and
displaying the screen having a different layout, which is different from the layout of the screen being displayed and which is newly determined, on the display device when the predetermined time is determined to have passed from when the layout has been previously changed.

9. A communication system comprising:
a receiver configured to receive one or more images from one or more information processing apparatuses communicating via a network;
a display number determiner configured to determine a number of the one or more images to be displayed on a display device based on a communication status;
a layout determiner configured to determine a layout of a screen on which the one or more images are displayed, according to the number of the one or more images determined by the display number determiner;
a time determiner configured to determine whether a predetermined time has passed from when the layout has been previously changed, when the display number determiner has determined to display a different number of the one or more images on the screen from the number of the one or more images that are displayed on the screen; and
a display processor configured to
display the screen having the layout, which has been previously changed, on the display device without changing the layout until the time determiner determines that the predetermined time has passed from when the layout has been previously changed, and to
display the screen having a different layout, which is different from the layout of the screen being displayed and which is newly determined by the layout determiner, on the display device when the time determiner determines that the predetermined time has passed from when the layout has been previously changed.

* * * * *